United States Patent
Ishiyama

(12) 
(10) Patent No.: US 6,564,625 B1
(45) Date of Patent: May 20, 2003

(54) METHOD OF DESIGNING A TIRE, METHOD OF DESIGNING A VULCANIZING MOLD FOR A TIRE, METHOD OF MAKING A VULCANIZING MOLD FOR A TIRE, METHOD OF MANUFACTURING A PNEUMATIC TIRE, AND RECORDING MEDIUM WITH TIRE DESIGNING PROGRAM RECORDED THEREON

(75) Inventor: Makoto Ishiyama, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 386 days.

(21) Appl. No.: 09/694,353

(22) Filed: Oct. 24, 2000

(30) Foreign Application Priority Data

Oct. 25, 1999 (JP) .......................................... 11-303162

(51) Int. Cl.$^7$ ............................................ G01M 17/02
(52) U.S. Cl. ....................................................... 73/146
(58) Field of Search .......... 73/146, 8; 152/209.1–209.9

(56) References Cited

FOREIGN PATENT DOCUMENTS

EP     1 030 170 A1     8/2000

OTHER PUBLICATIONS

Patent Abstracts of Japan abstracting JP 2000–141509 published May 23, 2000.

Browne, A.L. et al., "An Interactive Tire–Fluid Model for Dynamic Hydroplaning" , American Society for Testing Materials, 1983, pp. 130–150, No. 793, W.E. Meyer and J.D. Walter. No Mo.

Mindak, M. et al., "Simulation of the Aquaplane Problem", Computers and Structures, Jun. 18, 1997, pp. 1155–1164, vol. 64, No. 5/6, Elsevier Science Ltd., Great Britian.

*Primary Examiner*—William Oen
(74) *Attorney, Agent, or Firm*—Sughrue Mion, PLLC

(57) ABSTRACT

A method of designing a tire which takes into consideration actual conditions in the presence of a fluid, such as drainage performance, on-snow performance, noise performance, and the like. A tire model and a fluid model including the shape, structure, and the like are constructed, and a road surface condition is inputted (steps 100 to 106). Boundary conditions during tire rolling or tire nonrolling are set (step 108), deformation calculation and fluid calculation of the tire model are performed (steps 110 to 114), and a boundary surface between the tire model and the fluid model is recognized to update the boundary conditions (steps 118 and 120). The result of calculation is outputted as the result of estimation, and based on this result of estimation, main travel paths of the fluid, i.e., streamlines, are adopted (step 122), grooves are formed along the determined streamlines so that a tire model with patterns is constructed (steps 124 and 126), and the draft design having satisfactory performance is adopted (steps 128 to 132).

36 Claims, 28 Drawing Sheets

F I G. 7 A
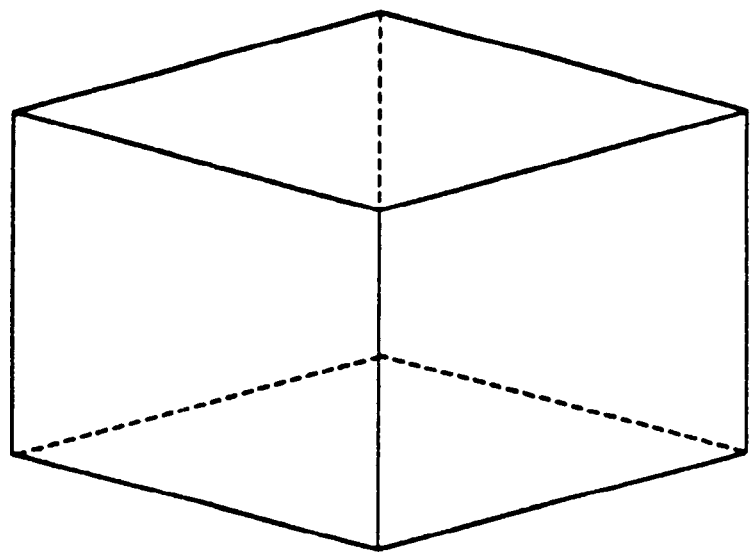
SOLID ELEMENT
F I G. 7 B
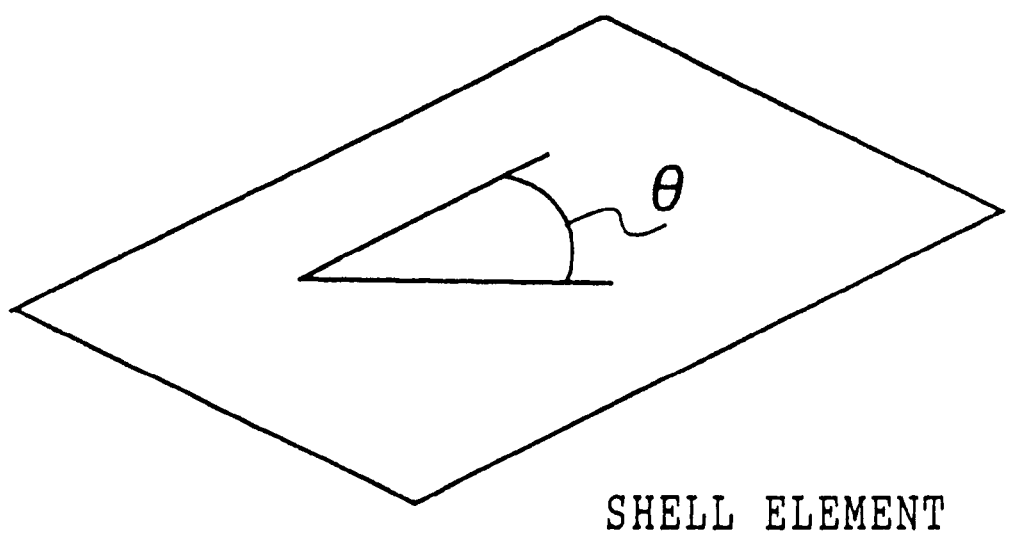
SHELL ELEMENT

F I G. 1 6 A
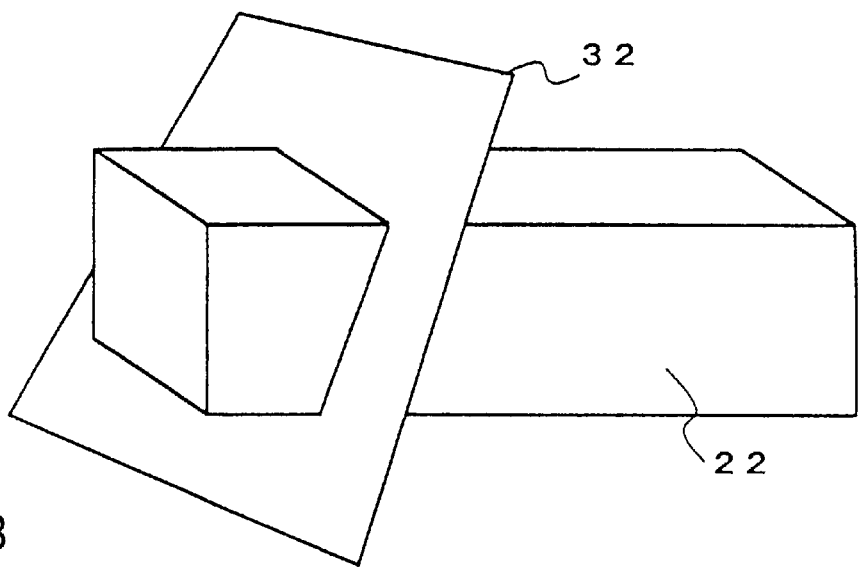
F I G. 1 6 B
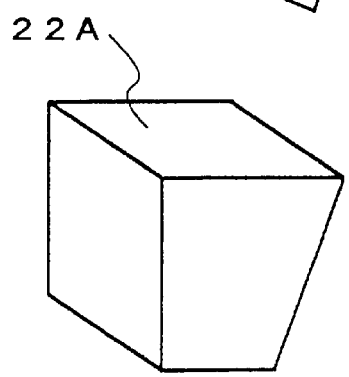

STREAMLINES

GROUND CONTACT CONFIGURATION

ARRANGEMENT OF GROOVES ALONG STREAMLINES

CAMBER ANGLE IS 3°

HIGHEST WATER PRESSURE

GROUND CONTACT CONFIGURATION

F I G. 2 8
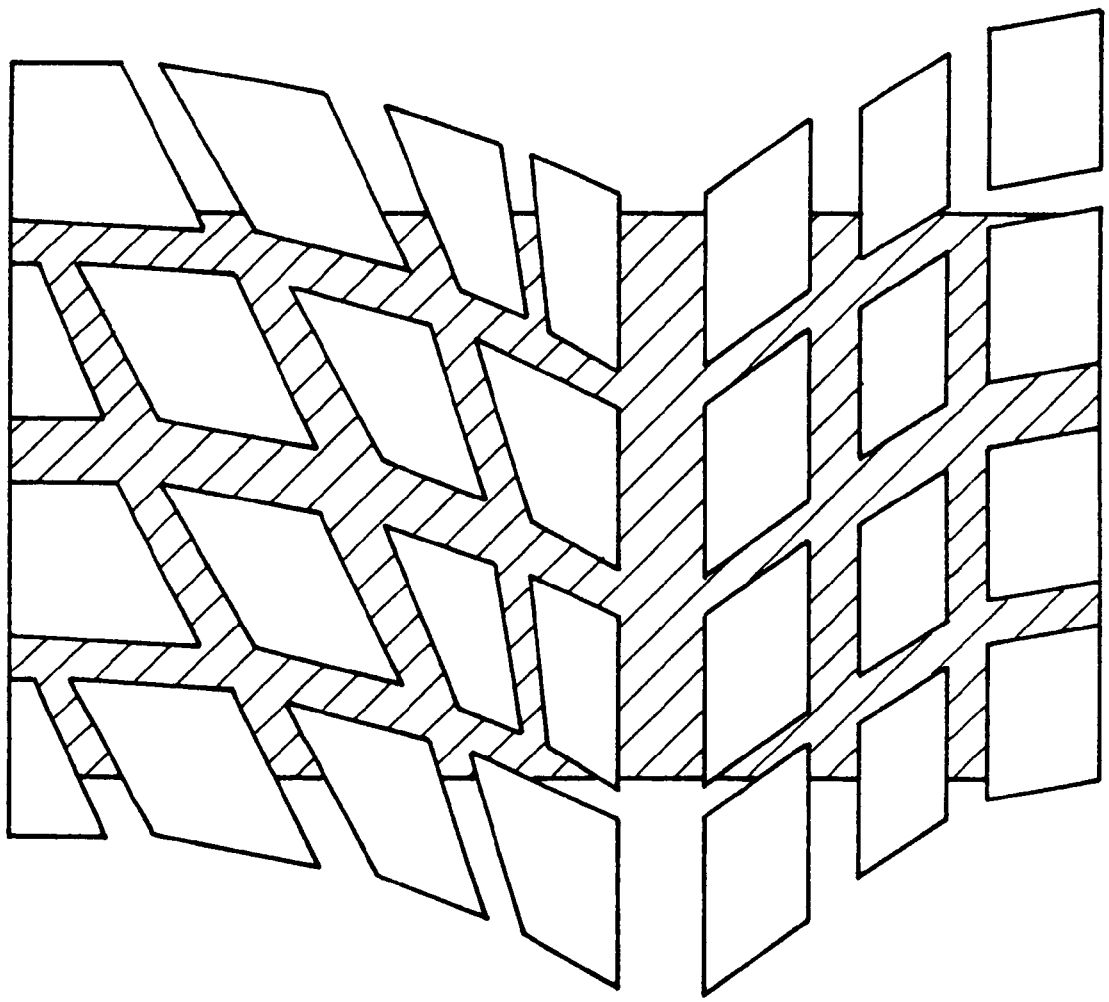

GROOVES DO NOT COINCIDE WITH STREAMLINES

ALTHOUGH GROOVES COINCIDE WITH STREAMLINES, THE WIDTH OF THE GROOVES IS UNIFORM

GROOVES COINCIDE WITH STREAMLINES
THE GROOVES NEAR THE CENTRAL PORTION WHERE WATER PRESSURE IS HIGH ARE WIDE

METHOD OF DESIGNING A TIRE, METHOD OF DESIGNING A VULCANIZING MOLD FOR A TIRE, METHOD OF MAKING A VULCANIZING MOLD FOR A TIRE, METHOD OF MANUFACTURING A PNEUMATIC TIRE, AND RECORDING MEDIUM WITH TIRE DESIGNING PROGRAM RECORDED THEREON

BACKGROUND OF THE INVENTION

1. Field of the Invention

The present invention relates to a method of designing a tire, a method of designing a vulcanizing mold for a tire, a method of making a vulcanizing mold for a tire, a method of manufacturing a pneumatic tire, and a recording medium with a tire designing program recorded thereon. Specifically, the present invention relates to a tire designing method for designing a tire while considering the performance of a pneumatic tire used in an automobile or the like, particularly the tire performance, such as drainage performance, on-snow performance, and noise performance, in the presence of a fluid, a method of designing a vulcanizing mold for a tire which vulcanizing mold is for manufacturing a tire, a method of making a vulcanizing mold for a tire, a method of manufacturing a pneumatic tire, and a recording medium with a tire designing program recorded thereon.

2. Description of the Related Art

Conventionally, in the development of a pneumatic tire, tire performance is obtained by conducting performance tests by actually designing and manufacturing a tire and mounting it on an automobile, and if the results of the performance tests are unsatisfactory, the procedure is repeated starting from the design and manufacture. In recent years, owing to the development of numerical analysis techniques such as the finite element method and the development of the computer environment, it has become possible to estimate by computers the state of inflation of the tire with internal pressure and the state of load at a time when the tire is not rolling, and it has become possible to make a number of performance estimates based on this estimation. However, it has hitherto been impossible to compute those tire performances such as drainage performance, on-snow performance, and noise performance, that are determined by the behavior of a fluid. For this reason, the present situation is such that it is impossible to conduct the estimation of tire performance and efficiently perform tire development.

A technical document is known in which an attempt was made to analyze the drainage performance, particularly hydroplaning, of a tire with respect to a smooth tire (grooveless tire) and a tire provided with only circumferential grooves ("Tire Science and Technology, TSTCA, Vol. 25, No. 4, October-December, 1997, pp. 265–287").

However, in this conventional technical document, analysis is attempted with respect to only the smooth tire and the tire provided with only circumferential grooves, and no reference is made to tires with patterns having inclined grooves intersecting the circumferential direction of the tire, which largely contribute to the drainage performance in actual tires. Further, how the fluid during ground contact and rolling of the tire can be brought close to a flowing state and how transient analysis can be made possible is not addressed. Namely, no consideration has been given to an analysis in which an actual tire is assumed to be in an actual environment.

SUMMARY OF THE INVENTION

In view of the above-described facts, an object of the present invention is to obtain a method of designing a tire which is capable of making tire development efficient while considering performance, such as drainage performance, on-snow performance, and noise performance, of a tire actually used in the presence of a fluid, and is capable of obtaining a tire exhibiting satisfactory performance, a method of designing a vulcanizing mold for a tire, a method of making a vulcanizing mold for a tire, a method of manufacturing a pneumatic tire, and a recording medium (recordable/readable medium) with a tire designing program recorded thereon.

To attain the above object, in the present invention, performance, such as drainage performance, on-snow performance, and noise performance, of a tire actually used in the presence of a fluid is estimated. In particular, the fluid at the time of ground contact and rolling of the tire is brought close to a flowing state, and transient analysis is made possible. In addition, the development of the tire is made efficient, and the provision of a tire having satisfactory performance is facilitated.

Specifically, the method of designing a tire according to a first aspect of the invention comprises the steps of: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on the at least one of ground contact and rolling of the tire model; (c) performing fluid calculation of the fluid model based on the at least one of ground contact and rolling of the tire model; and (d) estimating behavior of the fluid model due to the at least one of ground contact and rolling of the tire model, and designing a pattern configuration for the tire model based on the behavior of the fluid model.

A second aspect of the invention is the method according to the first aspect, wherein, in the step (d), at least one streamline of the fluid model, as the behavior of the fluid model, is estimated, and at least one groove is formed on the tire model on the basis of a direction in which the streamline extends.

A third aspect of the present invention is the method according to the first aspect, wherein, in the step (d), a pressure distribution of the fluid model, as the behavior of the fluid model, is estimated, and at least one groove is formed on the tire model on the basis of the pressure distribution of the fluid model.

A fourth aspect of the present invention is the method according to the third aspect, wherein, in the step (d), at least one substantially straight groove is formed on the tire model in a circumferential direction thereof on the basis of the pressure distribution of the fluid model.

A fifth aspect of the present invention is the method according to the third aspect, wherein, in the step (d), a volume of the groove formed on the tire model is determined on the basis of the pressure distribution of the fluid model.

A sixth aspect of the present invention is the method according to the first aspect, wherein re-execution of the steps (b), (c) and (d) is done using the tire model having the pattern configuration designed in the step (d), and at least one of a notch and a sipe is formed on the tire model on the basis of the behavior of the fluid model estimated in the re-execution of the steps (b), (c) and (d).

A seventh aspect of the invention is the method according to the first aspect further comprising the steps of: (1) identifying a boundary surface between the tire model after the deformation calculation in the step (b) and the fluid model after the fluid calculation in the step (c); (2) imparting a boundary condition, relating to the identified boundary surface, to the tire model and the fluid model; and (3) performing deformation calculation of the tire model and fluid calculation of the fluid model; wherein the steps of identifying a boundary surface, imparting a boundary condition, and performing deformation calculation of the tire model and fluid calculation of the fluid model are repeated until the fluid model assumes a state of pseudo flow.

An eighth aspect of the invention is the method according to the seventh aspect, further comprising the step of determining a physical quantity present in at least one of the tire model and the fluid model obtained in the steps (1) to (3), wherein in the step (d), the behavior of the fluid model is estimated on the basis of the physical quantity.

A ninth aspect of the invention is the method according to the first aspect, wherein the step (a) further includes determining a road surface model in contact with the fluid model.

A tenth aspect of the invention is the method according to the first aspect, wherein, in the step (b), the deformation calculation is repeated for no more than a predetermined time duration.

An eleventh aspect of the present invention is the method according to the tenth aspect, wherein the predetermined time duration is no more than 10 msec.

A twelfth aspect of the present invention is the method according to the first aspect, wherein, in the step (c), the fluid calculation is repeated for no more than a predetermined time duration.

A thirteenth aspect of the present invention is the method according to the twelfth aspect, wherein the predetermined time duration is no more than 10 msec.

A fourteenth aspect of the present invention is the method according to the seventh aspect, wherein the steps (1)–(3) are carried out within a predetermined time duration.

A fifteenth aspect of the invention is the method according to the fourteenth aspect, wherein the predetermined time duration is no more than 10 msec.

A sixteenth aspect of the invention is the method according to the first aspect, wherein if the tire model is a rolling model, the step (a) includes providing an internal pressure to the tire model, applying load to the tire model, and imparting at least one of a roational displacement, a speed, and a straight advance displacement.

A seventeenth aspect of the invention is the method according to the first aspect, wherein if the tire model is a rolling model, the step (a) includes imparting to the fluid model influx and efflux conditions such that fluid can flow out from a top surface of the fluid model and does not flow into or flow out of surfaces other than the top surface of the fluid model.

An eighteenth aspect of the invention is the method according to the first aspect, wherein if the tire model is a nonrolling model, the step (a) includes providing an internal pressure to the tire model, and applying load to the tire model.

A nineteenth aspect of the invention is the method according to the first aspect, wherein if the tire model is a nonrolling model, the step (a) includes imparting to the fluid model influx and efflux conditions such that fluid flows into a front surface of the fluid model at a predetermined velocity, the fluid can flow from a rear surface of the fluid model and a top surface of the fluid model, and the fluid does not flow into or flow out of side surfaces of the fluid model and a lower surface of the fluid model.

A twentieth aspect of the invention is the method according to the ninth aspect, wherein, determining a road surface model includes selecting a coefficient of friction $\mu$ for road surface condition representing at least one of road surface conditions including dry, wet, icy, snowy, and unpaved conditions.

A twenty-first aspect of the invention is the method according to the seventh aspect, wherein in the steps (1) to (3), an interfering portion is generated between the tire model and the fluid model, the interfering portion is identified, and the fluid model is divided with a boundary surface which is a surface of the tire model in the interfering portion, thereby fluid elements of the fluid model are divided.

A twenty-second aspect of the invention is the method according to the eighth aspect, wherein the fluid model contains at least water, and the physical quantity is at least one of ground contact area and ground contact pressure of the tire model in order for that the behavior of the fluid model is estimated.

A twenty-third aspect of the invention is the method according to the eighth aspect, wherein the fluid model contains at least water, and the physical quantity is at least one of pressure, flow volume, and flow velocity of the fluid model in order for that the behavior of the fluid model is estimated.

A twenty-fourth aspect of the invention is the method according to the eighth aspect, wherein the fluid model contains at least one of water and snow, and the physical quantity is at least one of ground contact area, ground contact pressure, and shearing force of the tire model on at least one of an icy road surface and a snowy road surface in order for that the behavior of the fluid model is estimated.

A twenty-fifth aspect of the invention is the method according to the eighth aspect, wherein the fluid model contains at least one of water and snow, and the physical quantity is at least one of pressure, flow volume, and flow velocity of the fluid model on at least one of an icy road surface and a snowy road surface in order for that the behavior of the fluid model is estimated.

A twenty-sixth aspect of the invention is the method according to the eighth aspect, wherein the fluid model contains at least air, and the physical quantity is at least one of pressure, flow volume, flow velocity, energy, and energy density in order for that the behavior of the fluid model is estimated.

A twenty-seventh aspect of the present invention is a method of designing a vulcanizing mold for a tire, comprising the steps of: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on the at least one of ground contact and rolling of the tire model; (c) performing fluid calculation of the fluid model based on the at least one of ground contact and rolling of the tire model; (d) identifying a boundary surface between the tire model after the deformation calculation in the step (b) and the fluid model after the fluid calculation in the step (c); (e) imparting a boundary condition, relating to the identified boundary surface, to the tire model and the fluid model; (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow; (g) determining a physical quantity present in at least one of the tire model and the fluid model in the steps (d)–(f); (h) estimating the behavior of the fluid model on the basis of the physical quantity; and (i) designing a vulcanizing mold for the tire on the basis of the tire model which has a pattern configuration designed on the basis of the behavior of the fluid model.

A twenty-eighth aspect of the present invention is a method of making a vulcanizing mold for a tire, wherein a vulcanizing mold for a pneumatic tire is designed by the method of designing a vulcanizing mold for a tire comprising the steps of: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on the at least one of ground contact and rolling of the tire model; (c) performing fluid calculation of the fluid model based on the at least one of ground contact and rolling of the tire model; (d) identifying a boundary surface between the tire model after the deformation calculation in the step (b) and the fluid model after the fluid calculation in the step (c); (e) imparting a boundary condition, relating to the identified boundary surface, to the tire model and the fluid model; (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow; (g) determining a physical quantity present in at least one of the tire model and the fluid model in the steps (d)–(f); (h) estimating the behavior of the fluid model on the basis of the physical quantity; and (i) designing a vulcanizing mold for the tire on the basis of the tire model which has a pattern configuration designed on the basis of the behavior of the fluid model.

A twenty-ninth aspect of the present invention is a method of manufacturing a pneumatic tire, wherein a vulcanizing mold for a pneumatic tire is made by the method of designing a vulcanizing mold for a tire comprising the steps of: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on the at least one of ground contact and rolling of the tire model; (c) performing fluid calculation of the fluid model based on the at least one of ground contact and rolling of the tire model; (d) identifying a boundary surface between the tire model after the deformation calculation in the step (b) and the fluid model after the fluid calculation in the step (c); (e) imparting a boundary condition, relating to the identified boundary surface, to the tire model and the fluid model; (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow; (g) determining a physical quantity present in at least one of the tire model and the fluid model in the steps (d)–(f); (h) estimating the behavior of the fluid model on the basis of the physical quantity; and (i) designing a vulcanizing mold for the tire on the basis of the tire model which has a pattern configuration designed on the basis of the behavior of the fluid model.

A thirtieth aspect of the invention is a method of manufacturing a pneumatic tire comprising the steps of: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on the at least one of ground contact and rolling of the tire model; (c) performing fluid calculation of the fluid model based on the at least one of ground contact and rolling of the tire model; (d) identifying a boundary surface between the tire model after the deformation calculation in the step (b) and the fluid model after the fluid calculation in the step (c); (e) imparting a boundary condition, relating to the identified boundary surface, to the tire model and the fluid model; (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow; (g) determining a physical quantity present in at least one of the tire model and the fluid model in the steps (d)–(f); (h) estimating the behavior of the fluid model on the basis of the physical quantity; and (i) designing a vulcanizing mold for the tire on the basis of the tire model which has a pattern configuration designed on the basis of the behavior of the fluid model.

A thirty-first aspect of the present invention is a recording medium with a tire designing program recorded thereon for designing a tire by a computer, wherein the tire designing program comprises the steps of: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on the at least one of ground contact and rolling of the tire model; (c) performing fluid calculation of the fluid model based on the at least one of ground contact and rolling of the tire model; (d) identifying a boundary surface between the tire model after the deformation calculation in the step (b) and the fluid model after the fluid calculation in the step (c); (e) imparting a boundary condition, relating to the identified boundary surface, to the tire model and the fluid model; (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow; (g) determining a physical quantity present in at least one of the tire model and the fluid model in the steps (d)–(f); (h) estimating the behavior of the fluid model on the basis of the physical quantity; and (i) designing a vulcanizing mold for the tire on the basis of the tire model which has a pattern configuration designed on the basis of the behavior of the fluid model.

A thirty-second aspect of the invention is the method according to the second aspect, wherein in the step (d), at least one groove is formed at a portion on the tire model which portion corresponds to a higher fluid-pressure portion in the fluid model.

A thirty-third aspect of the invention is the method according to the third aspect, wherein, in the step (d), at least one groove is formed at a portion on the tire model which portion corresponds to a higher fluid-pressure portion in the fluid model.

A thirty-fourth aspect of the invention is the method according to the fourth aspect, wherein, in the step (d), at least one substantially straight groove is formed at a portion on the tire model which portion corresponds to a higher fluid-pressure portion in the fluid model.

A thirty-fifth aspect of the invention is the method according to the fifth aspect, wherein, in the step (d), a large-volume groove is formed at a portion on the tire model which portion corresponds to a higher fluid-pressure portion in the fluid model.

A thirty-sixth aspect of the invention is the method according to the sixth aspect, wherein at least one of the notch and the sipe is formed at a portion on the tire model which portion corresponds to a higher fluid-pressure portion in the fluid model.

In the present invention, first, a draft design of the tire is incorporated into a model in numerical analysis so as to estimate the performance of a tire to be evaluated (such as the change of the shape, structure, materials, and pattern of the tire). Namely, a tire model which can be numerically analyzed (a numerical analysis model) is constructed. In the present invention, a model of a tire having no patterns, i.e., a so-called smooth tire, is used as the tire model. Further, modeling of a fluid and a road surface relating to the targeted performance is carried out to construct a fluid model and a road surface model (numerical analysis models), numerical analysis which simultaneously takes into consideration the tire, the fluid, and the road surface is carried out, and the targeted performance is numerically estimated. The acceptability of the draft design of the tire is determined from the result of this estimation, and if the result is favorable, the draft design is adopted, or a tire of this draft design is manufactured, and the performance evaluation is conducted. If these results up to this stage were satisfactory, the draft design was adopted. If the estimated performance (or actually measured performance) based on the draft design was unsatisfactory, a part or the whole of the draft design might be corrected, and the procedures were carried out again starting with the construction of the numerical analysis models. In this procedures, the number of times in manufacturing tires and the tire performance evaluations can be minimized, so that the development of the tire can be made more efficient.

Accordingly, to undertake the development of the tire based on the estimation of performance, a numerical analysis model for tire performance estimation which is efficient and highly accurate is essential. Therefore, in the present invention, in order to estimate the tire performance, in step (a), a tire model having no pattern configuration and to which deformation can be imparted by at least one of ground contact and rolling, as well as a fluid model which is filled with a fluid and comes into contact with at least a portion of the tire model, are determined. Further, a road surface model can be determined. In step (b), deformation calculation of the tire model is executed and, in step (c), fluid calculation of the fluid model is executed. Further, the following substeps (1) to (3) are repeated until the fluid model assumes a state of pseudo flow: (1) a boundary surface between the tire model after the deformation calculation in step (b) and the fluid model after the fluid calculation in step (c) is identified; (2) a boundary condition relating to the identified boundary surface is imparted to the tire model and the fluid model; and (3) the deformation calculation of the tire model and the fluid calculation of the fluid model are executed. A physical quantity present in at least one of the tire model and the fluid model in steps (1)–(3) is determined and, in step (d), the behavior of the fluid model is estimated on the basis of the physical quantity. Examples of the behavior of the fluid model include streamlines (flow lines) such as ridge lines formed at the time of deformation of the fluid and traces (tracks) formed when a part of the fluid splashes out and is scattered. In step (d), streamlines, for example, are estimated. Also in step (d), a pattern configuration of the tire model is designed on the basis of the behavior of the fluid model.

In this step (d), grooves which are formed along the streamlines estimated in this step (d) can be designed in the pattern. By designing grooves in this manner, passages can be formed on the tire model in accordance with the directions in which the fluid moves or with the amount of the fluid.

In step (d), grooves can be formed in the directions in which the streamlines of the entire fluid model extend. Moreover, in step (d), grooves can be formed at portions where pressure of the fluid model is high. Further, in step (d), substantially straight (linear) groove(s) can be formed along the circumferential direction of the tire at portions where pressure of the fluid model is high. Furthermore, in step (d), grooves can be formed at portions where pressure of the fluid model is high, the volume of which grooves is larger than that of grooves formed at other portions. Moreover, in step (d), the fluid calculation can further be executed by using the tire model with the designed pattern, and at least one of a notch and a sipe can further be formed at portions where pressure of the fluid model is high.

It is also possible that the above-described method of designing a tire excludes repeating the following substeps until the fluid model assumes a state of pseudo flow: (1) a boundary surface between the tire model after the deformation calculation in step (b) and the fluid model after the fluid calculation in step (c) is identified; (2) a boundary condition relating to the identified boundary surface is imparted to the tire model and the fluid model; and (3) the deformation calculation of the tire model and the fluid calculation of the fluid model are executed.

The method of designing a tire without determining a physical quantity present in at least one of the tire model and the fluid model is also possible. Accordingly, the method of designing a tire without estimating the behavior of the fluid model on the basis of the physical quantity is also possible.

By designing a tire in this manner, it is possible to contribute to the design of the tire while taking into consideration the flow of the fluid around the tire and estimating the smoothness of flow, occurrence of the disturbance, and the tire performance.

In step (b), deformation calculation of the tire model at a time when deformation is imparted thereto by at least one of ground contact and rolling of the tire model can be executed. In this case, at least one of ground contact and rolling may be set as the input to the tire model.

Further, when a boundary condition relating to the recognized boundary surface is imparted to the tire model and the fluid model, the fluid model may be determined in such a manner that the fluid is present on the road surface model side relative to the boundary surface.

It should be noted that at least one of the deformation calculation of the tire model and the fluid calculation may be repeatedly performed. The predetermined time duration (the elapsed time) during which the deformation calculation is repeatedly performed may be 10 msec or less, preferably 1 msec or less, and more preferably 1 $\mu$·sec or less. Further, the fixed time duration (the elapsed time) during which the fluid calculation is repeatedly performed may be 10 msec or less, preferably 1 msec or less, and more preferably 1 $\mu$·sec or less. If this time duration (elapsed time) is too long, the fluid in the fluid model fails to assume a state of pseudo flow suitable for the behavior of the tire, and the accuracy as a numerical model deteriorates. For this reason, it is necessary to use an appropriate value as the elapsed time.

In addition, calculation, until the fluid model assumes the state of pseudo flow, may also be performed repeatedly. In this calculation, 10 msec or less may be used as the predetermined time duration (the elapsed time) during which the repeated calculation is performed. Preferably, it is possible to use 1 msec or less, and more preferably 1 $\mu$·sec or less.

The aforementioned tire model may have a pattern partly. Further, as for the road surface model, an actual road surface condition can be reproduced by selecting a coefficient of friction $\mu$ representing a road surface condition of dry, wet, icy, snowy, unpaved or other conditions in accordance with the road surface condition.

When the boundary condition is imparted, it is important that the portion of the fluid model which is in contact with the surface of the tire model be recognized as the boundary surface of the fluid. However, if the very fine elements making up the fluid model are always made sufficiently small with respect to the tire model, and the number of constituent elements of the fluid model hence increases, an increase in the calculation time results, which entails difficulty. Accordingly, it is preferable to prevent an increase in the calculation time by making the very fine elements making up the fluid model large to a certain measure. At the same time, it is preferable to generate (overlap) an interfering portion between the tire model and the fluid model, identify (recognize) the interfering portion, and divide the fluid model with the surface of the tire model as a boundary surface, so as to allow the boundary surface between the tire model and the fluid model to be identified with high accuracy.

Further, if the fluid model contains at least water, and the ground contact area and ground contact pressure of the tire model are used as the physical quantity, it is possible to estimate the wet performance of the tire. Furthermore, if the fluid model contains at least water, and the pressure, flow volume, and flow velocity of the fluid model are used as the physical quantity, it is possible to estimate the behavior of the fluid model.

Moreover, if the fluid model contains at least one of water and snow, and at least one of the ground contact area, ground contact pressure, and shearing force of the tire model on at least one of an icy road surface and a snowy road surface is used as the physical quantity, it is possible to estimate the on-ice and on-snow performance of the tire. In addition, if the fluid model contains at least one of water and snow, and at least one of the pressure, flow volume, and flow velocity of the fluid model on at least one of an icy road surface and a snowy road surface is used as the physical quantity, it is possible to estimate the behavior of the fluid model with the on-ice and on-snow performance of the tire taken into consideration.

Further, if the fluid model contains at least air, and the pressure, flow volume, flow velocity, energy, and energy density of the fluid model is used as the physical quantity, it is possible to estimate the behavior of the fluid model with the noise performance of the tire taken into consideration.

Further, in a case where a tire vulcanizing mold for manufacturing a tire is designed, if the following steps are taken which include: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on the at least one of ground contact and rolling of the tire model; (c) performing fluid calculation of the fluid model based on the at least one of ground contact and rolling of the tire model; (d) identifying a boundary surface between the tire model after the deformation calculation in the step (b) and the fluid model after the fluid calculation in the step (c); (e) imparting a boundary condition, relating to the identified boundary surface, to the tire model and the fluid model; (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow; (g) determining a physical quantity present in at least one of the tire model and the fluid model in the steps (d)–(f); (h) estimating the behavior of the fluid model on the basis of the physical quantity; and (i) designing a vulcanizing mold for the tire on the basis of the tire model which has a pattern configuration designed on the basis of the behavior of the fluid model, then it is possible to evaluate the flow of the fluid around the tire to be manufactured and use this in designing of the mold for manufacturing a tire. That is, the mold is designed while estimating the smoothness of flow, the occurrence of disturbance, and the tire performance.

If the tire vulcanizing mold thus designed is made, the manufacture of the tire in which the estimated behavior of the fluid model is taken into consideration is facilitated. Further, if this tire vulcanizing mold is made, and the tire is manufactured by using it, it is possible to obtain a tire in which the evaluation of the flow of the fluid, the smoothness of the flow, the occurrence of disturbance, and the like have been taken into consideration.

Moreover, in a case where a tire is manufactured, if the following steps are provided which include: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on the at least one of ground contact and rolling of the tire model; (c) performing fluid calculation of the fluid model based on the at least one of ground contact and rolling of the tire model; (d) identifying a boundary surface between the tire model after the deformation calculation in the step (b) and the fluid model after the fluid calculation in the step (c); (e) imparting a boundary condition, relating to the identified boundary surface, to the tire model and the fluid model; (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow; (g) determining a physical quantity present in at least one of the tire model and the fluid model in the steps (d)–(f); (h) estimating the behavior of the fluid model on the basis of the physical quantity; and (i) designing a vulcanizing mold for the tire on the basis of the tire model which has a pattern configuration designed on the basis of the behavior of the fluid model, then it is possible to obtain a tire in which the evaluation of the flow of the fluid, the smoothness of the flow, the occurrence of disturbance, and the like have been taken into consideration.

Further, in a case where a tire is designed by a computer, if a tire designing program which includes the following steps is stored in a storage medium and is executed, and if data is collected: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on the at least one of ground contact and rolling of the tire model; (c) performing fluid calculation of the fluid model based on the at least one of ground contact and rolling of the tire model; (d) identifying a boundary surface between the tire model after the deformation calculation in the step (b) and the fluid model after the fluid calculation in the step (c); (e) imparting a boundary condition, relating to the identified boundary surface, to the tire model and the fluid model; (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow; (g) determining a physical quantity present in at least one of the tire model and the fluid model in the steps (d)–(f); (h) estimating the behavior of the fluid model on the basis of the physical quantity; and (i) designing a vulcanizing mold for the tire on the basis of the tire model which has a pattern configuration designed on the basis of the behavior of the fluid model, then it is possible to perform tire designing which reflects the behavior of the fluid.

BRIEF DESCRIPTION OF THE DRAWINGS

FIG. 7A is an image diagram of an element at the time of modeling and explains the handling of a rubber portion.

FIG. 7B is an image diagram of an element at the time of modeling and explains the handling of a reinforcing member.

FIG. 16A is an explanatory diagram for explaining a fluid element before its division.

FIG. 16B is an explanatory diagram for explaining the fluid side of the fluid element after division.

FIG. 28 is a diagram illustrating a pattern including grooves formed on the tire.

DESCRIPTION OF THE PREFERRED EMBODIMENTS

Figure 1:
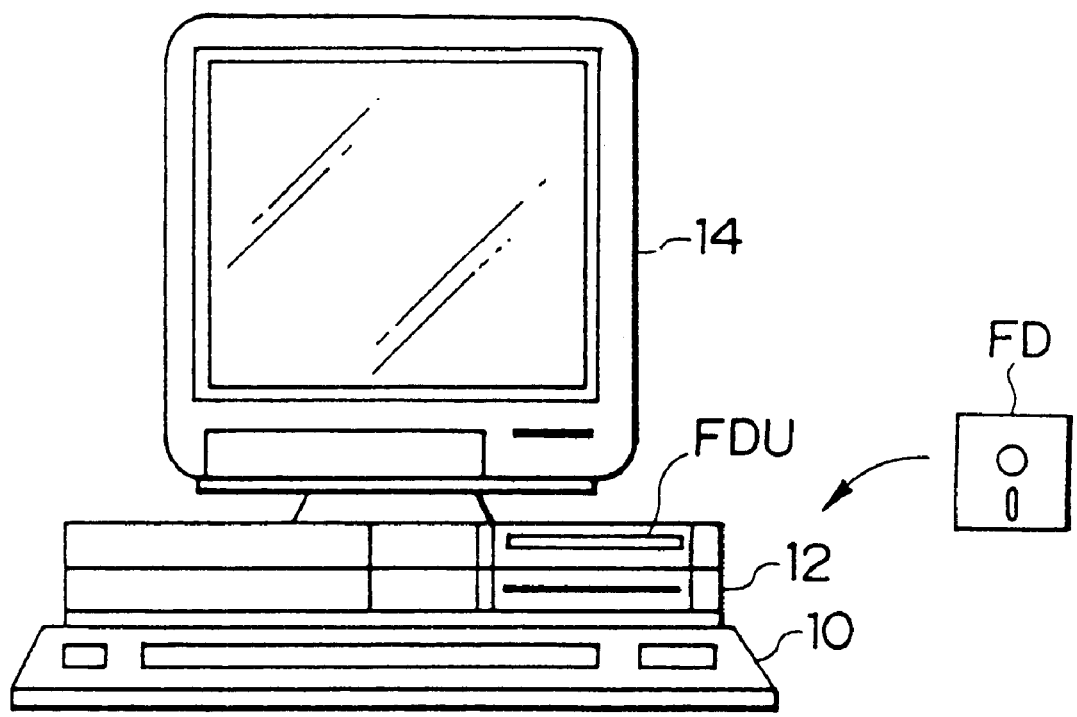
FIG. 1 is a schematic diagram of a personal computer for carrying out a method of designing a tire in accordance with embodiments of the present invention.

Referring now to the drawings, a detailed description will be given of the embodiments of the present invention.

First Embodiment

In a first embodiment, the present invention is applied to a method of designing a pneumatic tire. FIG. 1 shows a schematic diagram of a personal computer for executing the method of designing a pneumatic tire in accordance with the invention. This personal computer is comprised of a keyboard 10 for entering data and the like, a main unit 12 of a computer for estimating tire performance in accordance with a processing program stored in advance, and a CRT 14 for displaying the results of computation or the like by the main unit 12 of the computer.

It should be noted that the main unit 12 of the computer has a floppy disk unit (FDU) into which a floppy disk (FD) serving as a recording medium (recordable/readable medium) can be loaded and unloaded. Incidentally, the processing routines and the like, which will be described later, can be read and written on the floppy disk FD by using the FDU. Accordingly, the processing routines, which will be described later, may be recorded in advance on the FD, and the processing program recorded on the FD may be executed by means of the FDU. In addition, a large-capacity storage device (not shown) such as a hard disk drive may be connected to the main unit 12 of the computer, and the processing program recorded on the FD may be stored (installed) in the large-capacity storage device (not shown) so as to execute the processing program. In addition, optical disks such as a CD-ROM and magneto-optic disks such as an MD and an MO are available as recording media, and when they are to be used, it suffices if a CD-ROM drive, an MD drive, an MO drive, and the like are used instead of or in addition to the aforementioned FDU.

Figure 2:
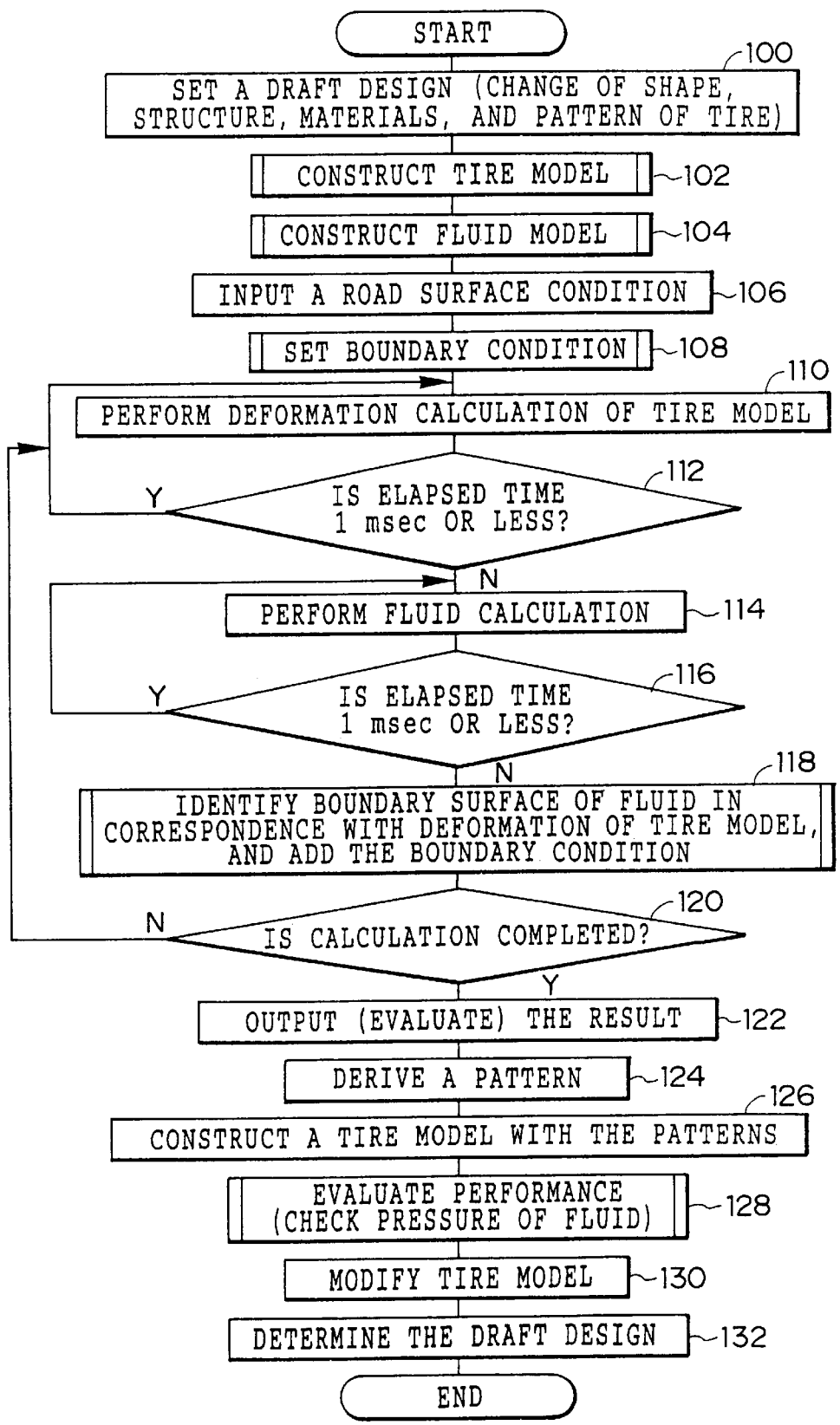
FIG. 2 is a flowchart illustrating the flow of processing of a program for designing a pneumatic tire in accordance with a first embodiment of the present invention.

FIG. 2 shows a processing routine of a design program in accordance with this embodiment. In step 100, a draft design of the tire (such as shape, structure, and materials of the tire) is set. In a subsequent step 102, a tire model of a smooth tire without patterns is constructed to incorporate the draft design of the tire into a model in numerical analysis. This construction of the tire model varies slightly depending on the numerical analysis method used. In the present embodiment, it is assumed that the finite element method (FEM) is used as the numerical analysis method. Accordingly, the tire model which is constructed in the aforementioned step 102 refers to one in which a relevant region is divided up into a plurality of elements corresponding to the finite element method (FEM), e.g., by meshing, and the tire is numerically represented in a data format for input into a computer program prepared according to a numerical and analytical technique. This division into elements refers to dividing up an object such as the tire, fluid, road surface, and the like into a number of (a finite number of) small subregions. Calculations are performed for the respective subregions, and after completion of the calculation for all the subregions, all the subregions are summed up, thereby making it possible to obtain a response for the whole. Incidentally, the difference method or the finite volume method may be employed as the numerical analysis method.

Figure 3:
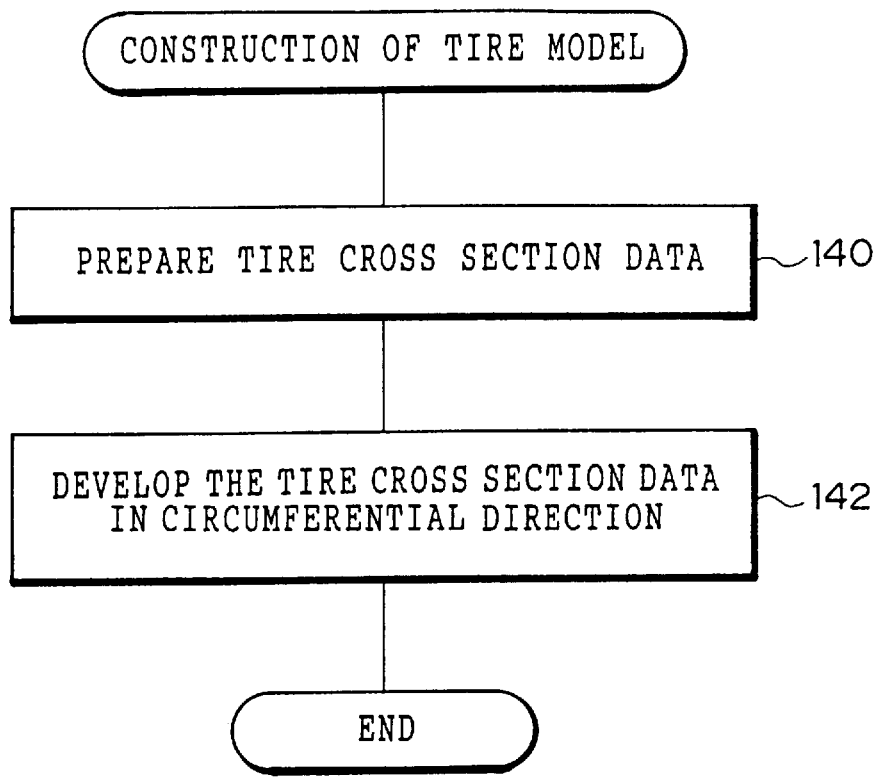
FIG. 3 is a flowchart illustrating the flow of tire-model construction processing.
Figure 4:
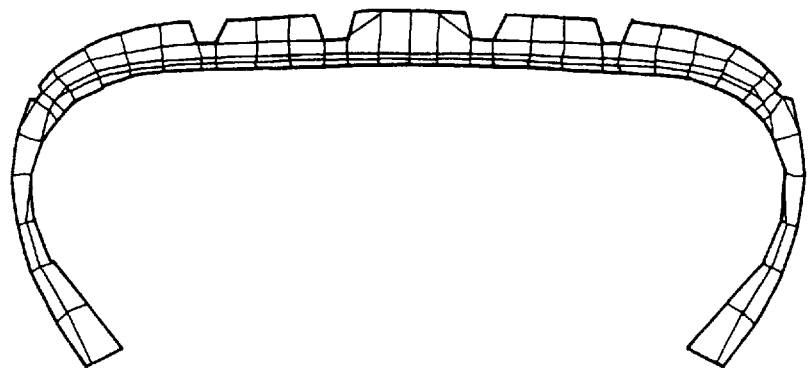
FIG. 4 is a perspective view illustrating a radially cross-sectional model of the tire.
Figure 17:
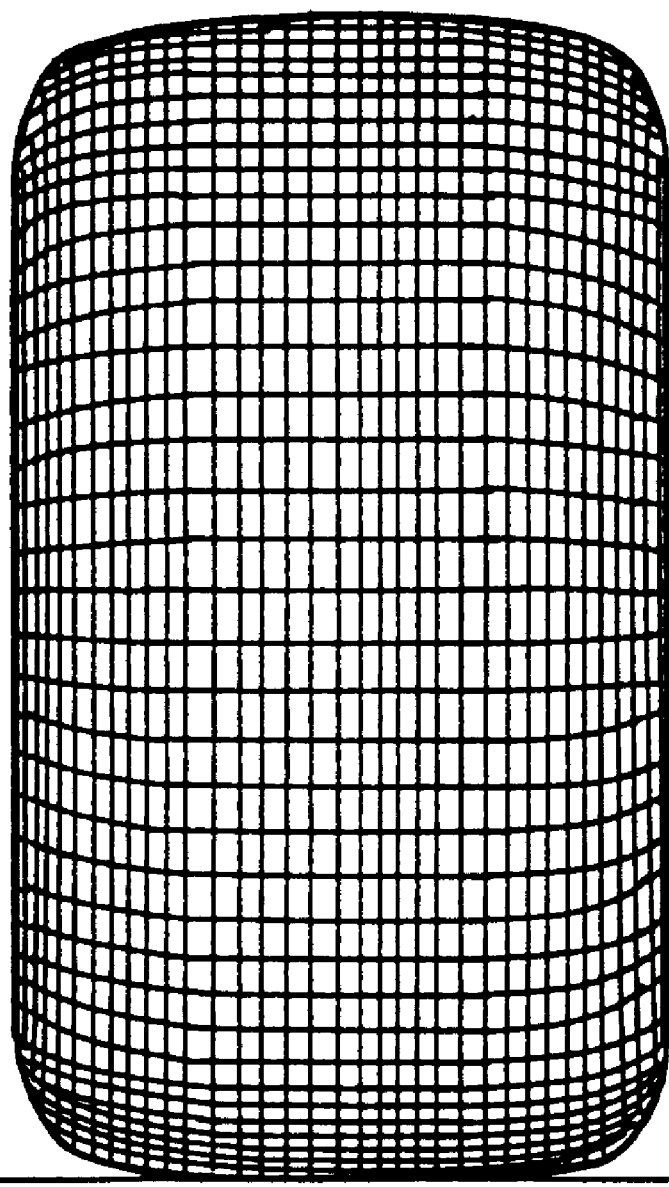
FIG. 17 is a diagram illustrating a smooth tire model.
Figure 18:
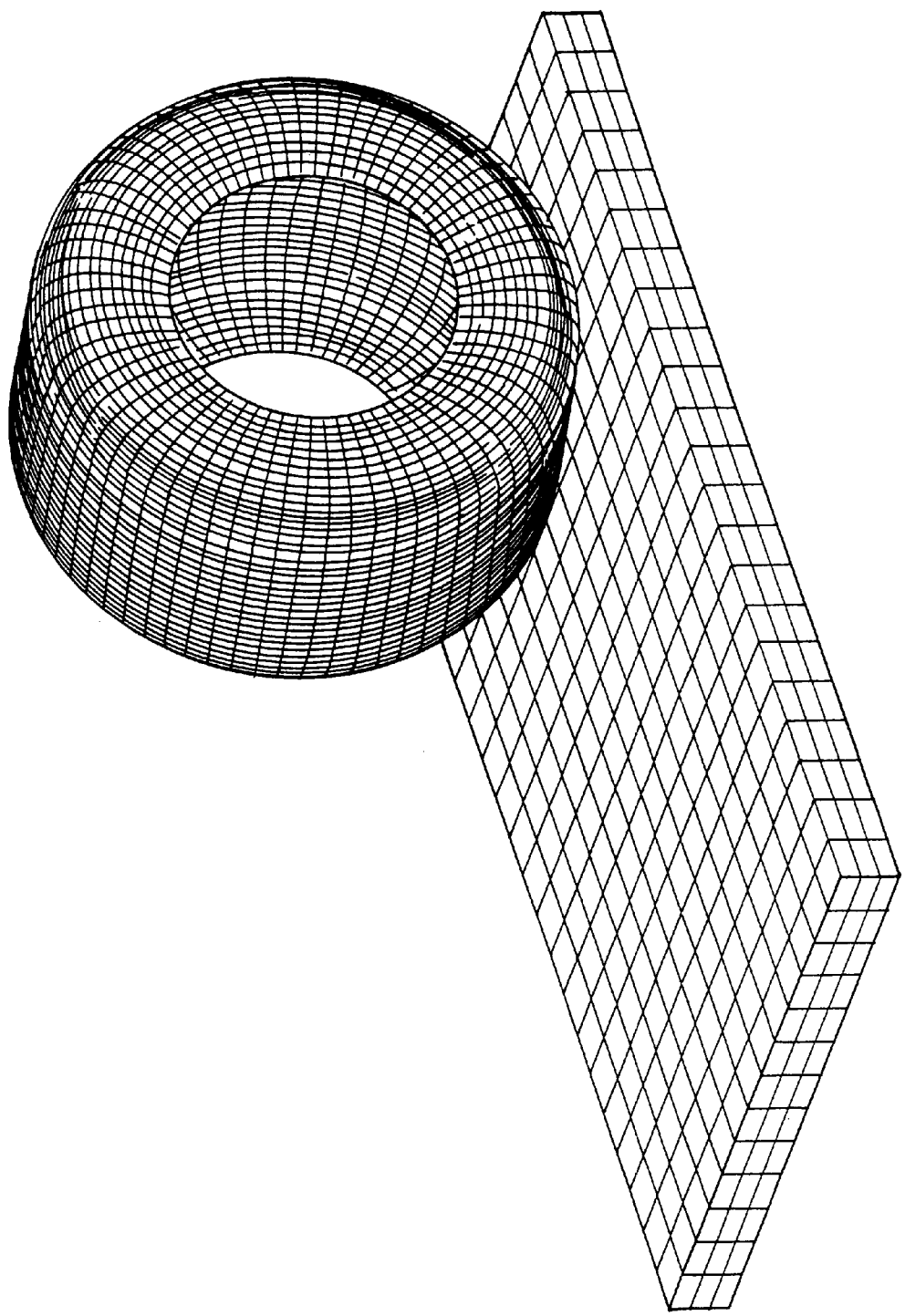
FIG. 18 is a diagram illustrating the smooth tire model and the fluid model.

In the construction of the tire model in the aforementioned step 102, a tire model construction routine shown in FIG. 3 is executed. First, in step 140, a model of a radial cross section of the tire is constructed in step 140. Namely, tire cross section data is prepared. In this tire cross section data, the external shape of the tire is measured by a laser shape measuring instrument or the like, and values are collected. Further, as for the internal structure of the tire, accurate values are collected from the design drawings and cross-sectional data of an actual tire and the like. The rubber and reinforcing members (those in which reinforcing cords formed of iron, organic fibers, and the like are bundled in sheets, such as belts and plies) in the cross section of the tire are respectively modeled in accordance with a modeling technique of the finite element method. In an ensuing step 142, tire cross section data (a model of the radial cross section of the tire) which is two-dimensional data is developed by a one-circumference (by a one round) in the circumferential direction so as to construct a three-dimensional (3D) model of the tire. In this case, it is preferable to model the rubber portion by 8-node solid elements and to model the reinforcing members by anisotropic shell elements capable of representing angles. For example, as shown in FIG. 7A, the rubber portion can be handled by 8-node solid elements and, as shown in FIG. 7B, the reinforcing members (belts, plies) can be handled by shell elements, making it possible to take into consideration the angle θ of the reinforcing member two-dimensionally. As a result, a tire model shown in FIG. 17 is constructed. Further, in FIG. 18, a state is shown in which the tire model is placed on a fluid model, which will be described later.

Figure 8:
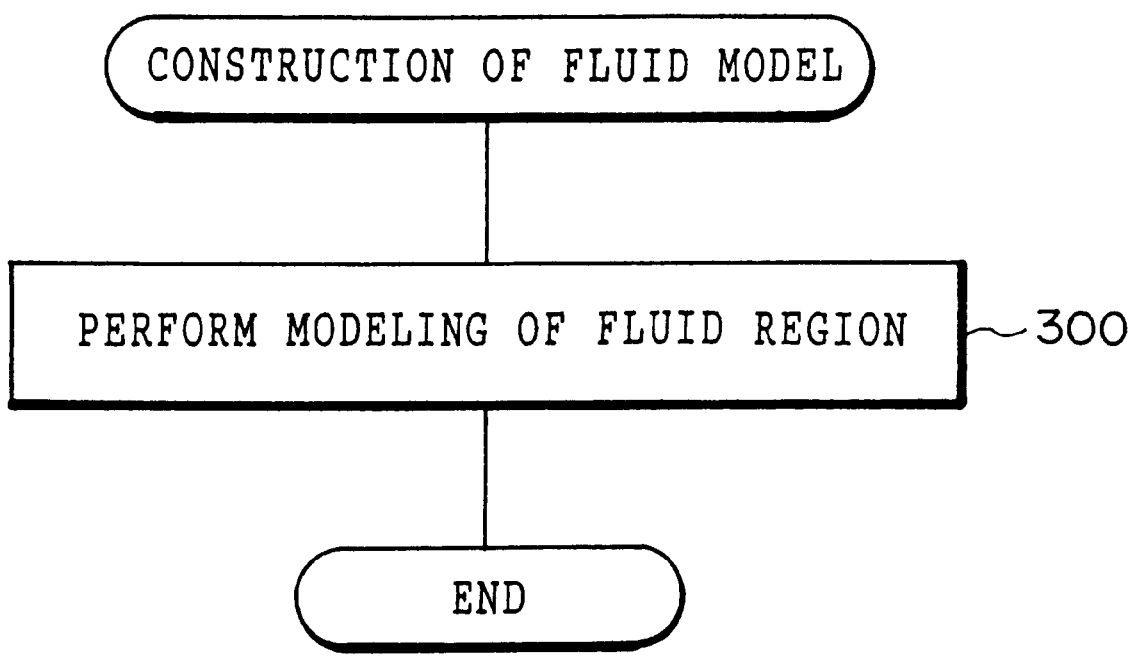
FIG. 8 is a flowchart illustrating the flow of fluid-model construction processing.

After constructing the tire model as described above, the operation proceeds to step 104 in FIG. 2 to construct a fluid model. In this step 104, the processing routine shown in FIG. 8 is executed. In step 300 in FIG. 8, a fluid region including a part (or the whole) of the tire, the ground contact surface, and the region where the tire moves and deforms is divided and modeled. The fluid region should preferably be divided by rectangular parallelepipeds, and fluid elements which are these rectangular parallelepipeds for division should preferably be divided by an 8-node Eulean mesh. In addition, the tire model and the fluid model are defined in a partially overlapping manner. The pattern portion of the tire model has a complex surface configuration, and the fact that it is unnecessary to define the fluid mesh in conformity with the surface configuration makes it possible to substantially reduce the time and trouble required for modeling the fluid model, and is important in effecting the performance estimation efficiently.

Figure 9A:
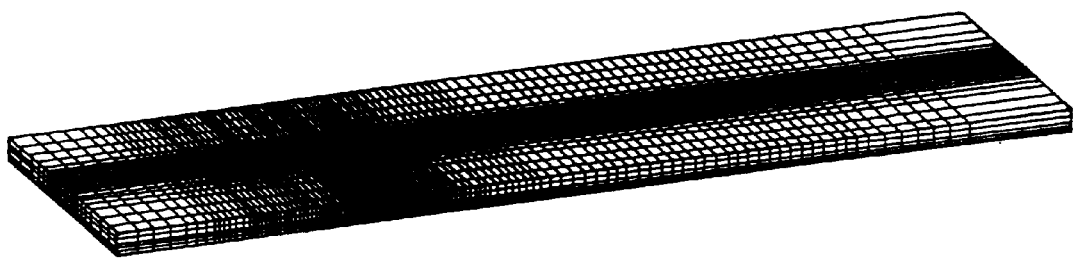
FIG. 9A is a perspective view illustrating a fluid model.
Figure 9B:
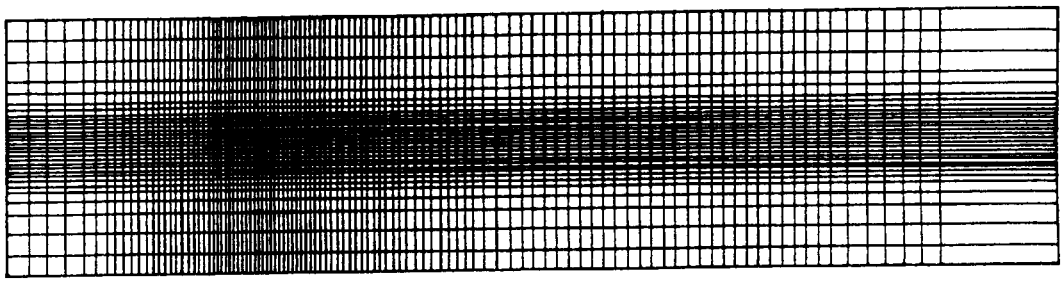
FIG. 9B is a plan view illustrating the fluid model.

It should be noted that since the fluid region used for the fluid model includes the region in which the tire moves, in modeling in a state in which the tire model is not rolled (hereafter referred to as tire nonrolling), a region is modeled which is five times or more as long as the ground contact length in the advance direction, three times or more as wide as the ground contact width in the widthwise direction, and, for instance, 30 mm or more in the depthwise direction. In modeling in a state in which the tire model is rolled (hereafter referred to as tire rolling), a fluid region is modeled which is, for instance, 2 m or more (a distance for one revolution of the tire or more) in the advance direction. A fluid model thus modeled is shown in FIGS. 9A and 9B. FIG. 9A is a perspective view of the fluid model, and FIG. 9B is a plan view thereof.

When the construction of the fluid model is completed as described above, the operation proceeds to step 106 in FIG. 2 to construct a road surface model and input the condition of the road surface. In this step 106, the road surface is modeled, and an input is made to set the modeled road surface in the actual condition of the road surface. In the modeling of the road surface, the configuration of the road surface is modeled by being divided up into elements, and the road surface condition is inputted by selecting and setting the coefficient of friction $\mu$ of the road surface. Namely, since there are coefficients of friction $\mu$ of the road surface corresponding to the dry, wet, icy, snowy, unpaved, or other conditions in accordance with the road surface conditions, an actual condition of the road surface can be reproduced by selecting an appropriate value for the coefficient of friction $\mu$. In addition, it suffices if the road surface model is in contact with at least one portion of the aforementioned fluid model, and may be disposed inside the fluid model.

After the road surface condition is thus inputted, boundary conditions are set in an ensuing step 108. Namely, since a portion of the tire model is present in a portion of the fluid model, it is necessary to simulate the behavior of the tire and the fluid by imparting analytical boundary conditions to the fluid model and the tire model. This procedure differs between the case of tire rolling and the case of tire nonrolling. This selection of tire rolling or tire nonrolling may be inputted in advance, or the selection may be made at the outset of execution of this processing, or both cases may be executed, and one may be selected after both cases are determined.

Figure 10:
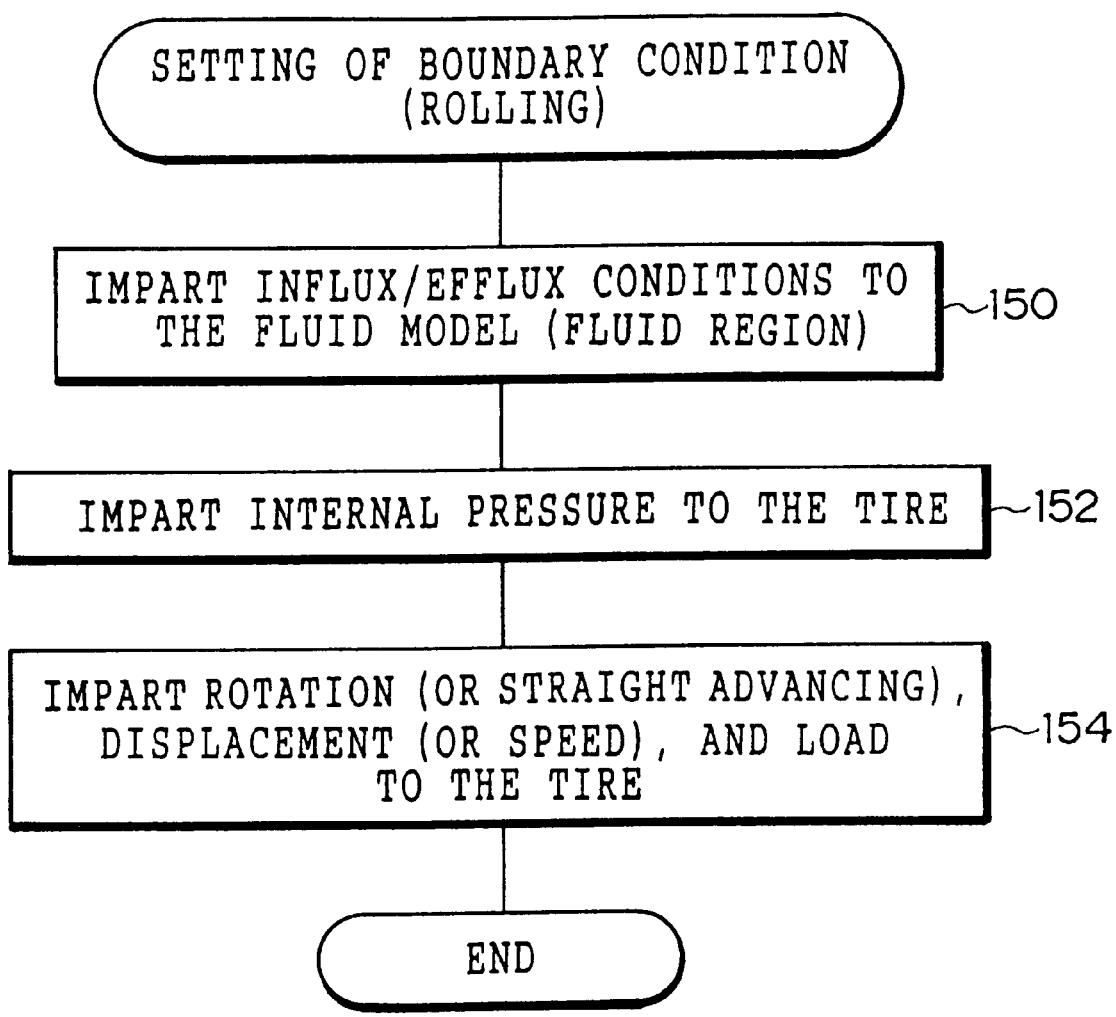
FIG. 10 is a flowchart illustrating the flow of boundary-condition setting processing during rolling.
Figure 12:
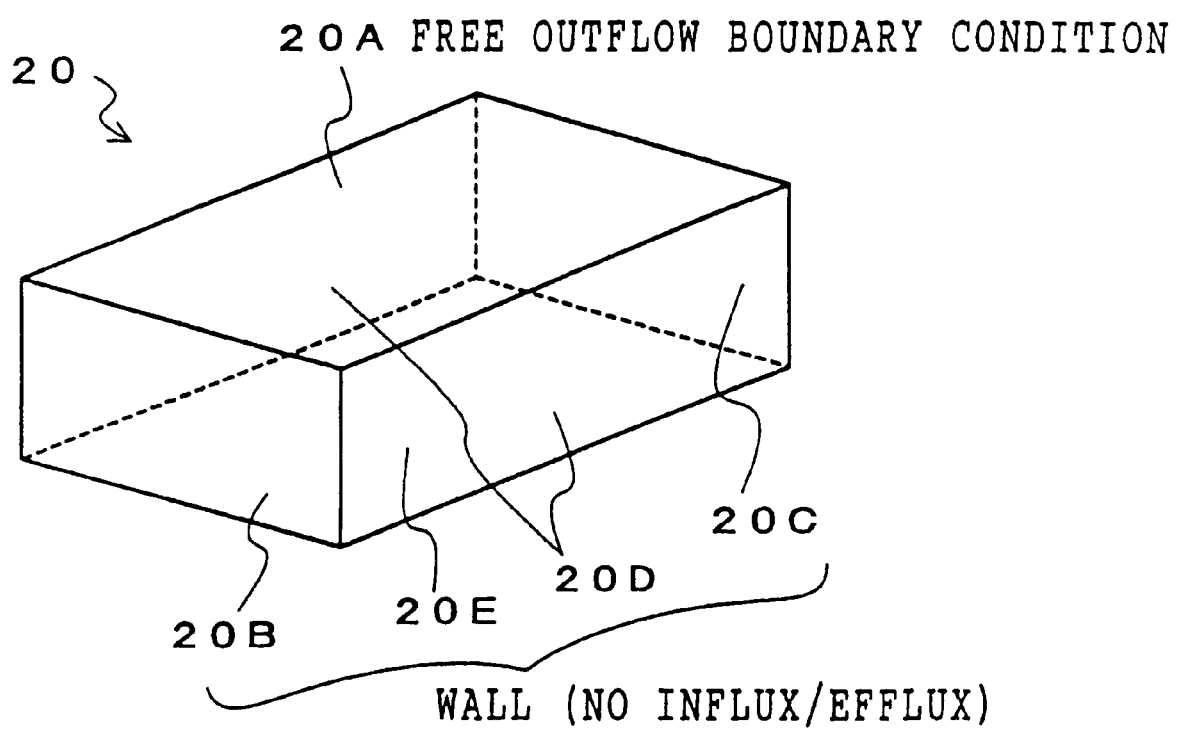
FIG. 12 is an explanatory diagram for explaining the setting of a boundary condition during rolling.

In the setting of boundary conditions in the case of tire rolling in step 108, the processing routine shown in FIG. 10 is executed. First, the operation proceeds to step 150 to impart boundary conditions relating to influx and efflux to a fluid model (fluid region) 20. As shown in FIG. 12, these boundary conditions relating to influx and efflux are such that the fluid flows out freely from a top surface 20A of the fluid model (fluid region) 20, and that the other surfaces including a front surface 20B, a rear surface 20C, side surfaces 20D, and a bottom surface 20E are assumed as walls (no influx nor efflux). In a subsequent step 152, internal pressure is imparted to the tire model. In an ensuing step 154, at least one of a rotational displacement and a straight (linear) advance displacement (the displacement may be force or velocity), and a predetermined load is placed on the tire model. Incidentally, in a case where the friction with the road surface is taken into consideration, only either one of the rotational displacement (or may be force or velocity) and the straight advance displacement (or may be force or velocity) may be imparted.

Figure 11:
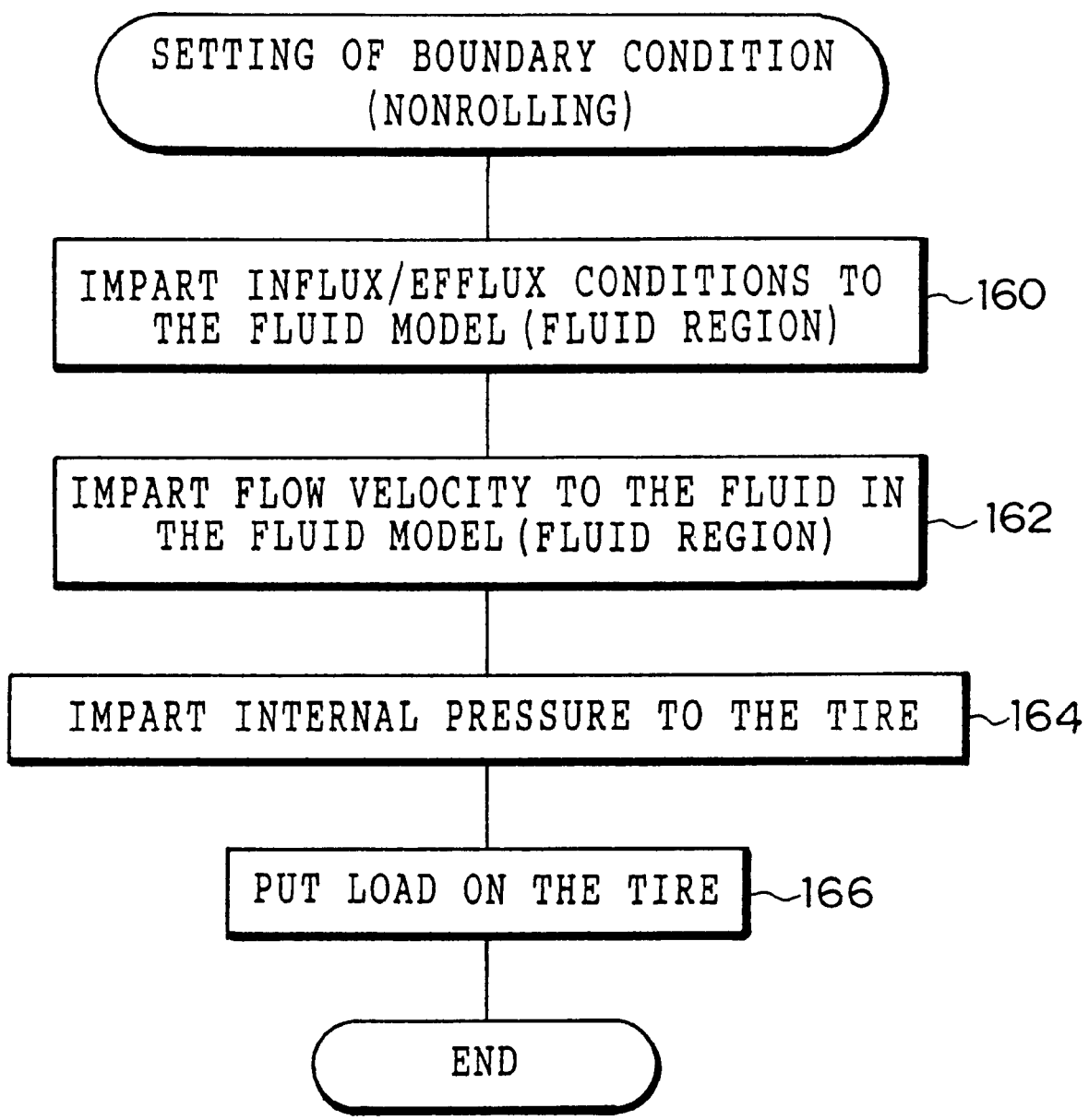
FIG. 11 is a flowchart illustrating the flow of boundary-condition setting processing during nonrolling.
Figure 13:
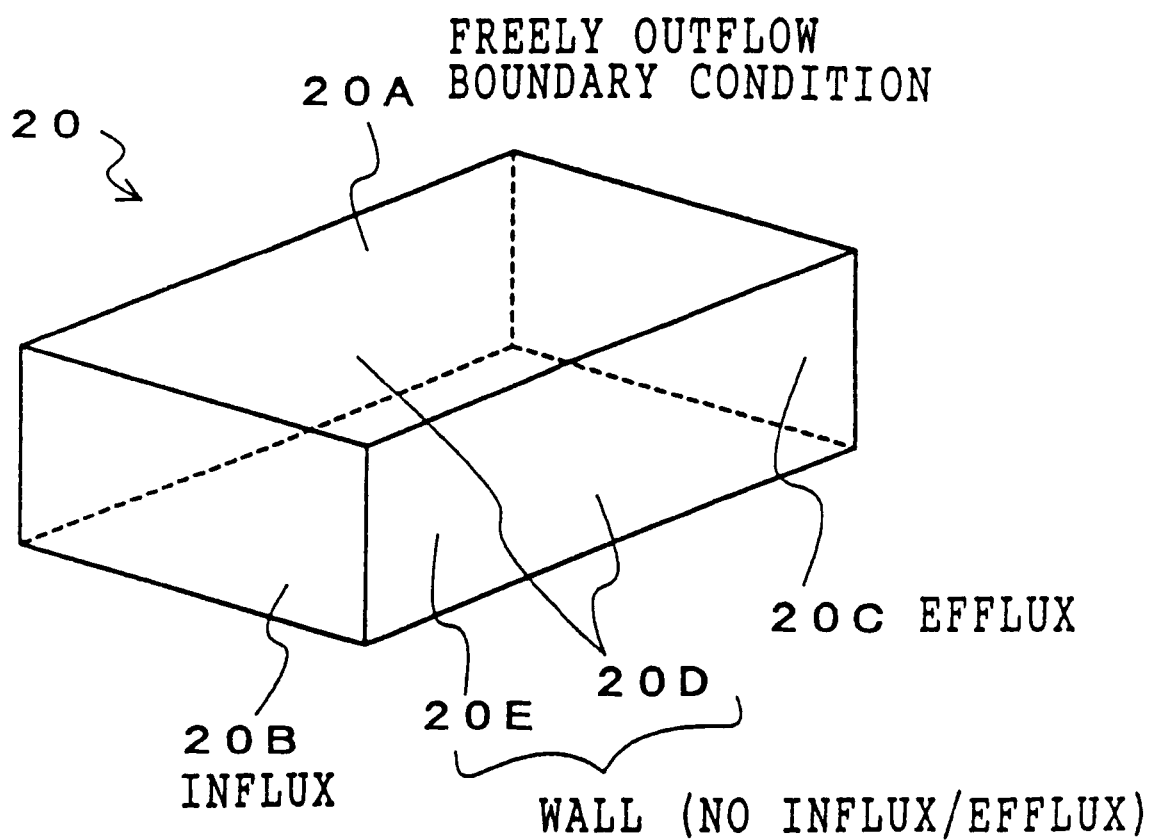
FIG. 13 is an explanatory diagram for explaining the setting of the boundary condition during nonrolling.

Further, in the setting of boundary conditions in the case of tire nonrolling in step 108, the processing routine shown in FIG. 11 is executed. First, in step 160, boundary conditions relating to influx and efflux are imparted to the fluid model. Here, to perform the analysis in the steady state, the tire model is assumed to be stationary in the advance direction, and a fluid model is considered in which the fluid flows toward the tire model at an advance velocity. Namely, in step 162, flow velocity is imparted to the fluid in the fluid model (fluid region). As shown in FIG. 13, as for the boundary conditions relating to influx and efflux, it is assumed that the fluid flows in through the front surface of the fluid model (fluid region) 20 at the advance velocity and flows out from the rear surface, and that the top surface, side surfaces, and lower surface are similar to those in the case of rolling of the tire. Then, in step 164, internal pressure is imparted to the tire model and, in a subsequent step 166, a predetermined load is placed on the tire model.

Next, the calculation of deformation of the tire model as analysis A and the calculation of the fluid (flow calculation) as analysis B, which will be described below, are performed on the basis of the numerical models which have been constructed or set in the steps through to step 108. To obtain a transient state, the calculations of deformation of the tire model and the calculations of the fluid of the fluid model are respectively performed independently within 1 msec, and boundary conditions for them are updated for each 1 msec.

Namely, when the setting of the boundary conditions is completed in the aforementioned step 108, the operation proceeds to step 110 to perform the calculation of deformation of the tire model. In an ensuing step 112, a determination is made as to whether or not the elapsed time is 1 msec or less. If the determination in step 112 is affirmative, the operation returns to step 110 to perform the calculation of deformation of the tire model again. If the determination in step 112 is negative, the operation proceeds to step 114 to perform the calculation of the fluid. In an ensuing step 116, a determination is made as to whether or not the elapsed time is 1 msec or less. If the determination is affirmative, the operation returns to step 114 to perform the calculation of the fluid again. If the determination in step 116 is negative, the operation proceeds to step 118.

(Analysis A) Calculation of Deformation of Tire Model

The calculation of deformation of the tire model is performed on the basis of the finite element method using the tire model and the given boundary conditions. To obtain a transient state, the calculation of deformation of the tire model is repeated while the elapsed time (independent elapsed time) is 1 msec or less, and after 1 msec elapses the operation proceeds to the ensuing calculation (fluid).

(Analysis B) Calculation of Fluid

The calculation of the fluid is performed on the basis of the finite element method using the fluid model and the given boundary conditions. To obtain a transient state, the calculation of the fluid is repeated while the elapsed time (independent elapsed time) is 1 msec or less, and after 1 msec elapses the operation proceeds to the ensuing calculation (deformation of the tire model).

It should be noted that the calculation may be first started with either analysis A or analysis B, or the calculations may be effected in parallel. Namely, the order of steps 110 and 112 on the one hand, and steps 114 and 116 on the other hand, may be exchanged.

In addition, although in the aforementioned calculations (analysis A and analysis B), a description has been given of the case in which the calculation is repeatedly performed during a preferred elapsed time, i.e., the elapsed time (independent elapsed time) of 1 msec or less, the elapsed time in the present invention is not limited to 1 msec, and it is possible to use an elapsed time of 10 msec or less. The preferred elapsed time is 1 msec or less, and more preferably it is possible to use an elapsed time of 1 $\mu$·sec or less. Further, as this elapsed time, different time durations may be set for analysis A and analysis B.

In a subsequent step 118, after independent calculations are respectively performed for 1 msec each for the calculation of deformation of the tire model and the calculation of the fluid, in order to establish linkage between them, the boundary surface of the fluid model is recognized (identified) in correspondence with the deformation of the tire model, and the boundary conditions are updated (details of which will be described later). In this step 118, after the updating of the boundary conditions, the pressure calculated in the calculation of the fluid is applied to the tire model as a boundary condition (surface force) of the tire model, so that the deformation of the tire model due to the flow force will be calculated in an ensuing calculation of deformation of the tire model (analysis A). Namely, on the fluid side, the surface configuration of the tire model after deformation is incorporated into the boundary condition as a new wall, while, on the tire model side, the pressure of the fluid is incorporated into the boundary conditions as the surface force applied to the tire model. By repeating this step for every 1 msec, it is possible to artificially create transient flow relating to the estimation of tire performance. Here, 1 msec is the time within which it is possible to sufficiently represent the process in which the pattern within the ground contact plane undergoes deformation due to the tire rolling.

It should be noted that although in the above description the repeated time (independent elapsed time) for updating the boundary conditions is set to 1 msec or less, the present invention is not limited to 1 msec, and it is possible to use a time duration of 10 msec or less. The preferred elapsed time is 1 msec or less, and more preferably it is possible to use a time duration of 1 $\mu$·sec or less.

In an ensuing step 120, a determination is made as to whether or not the calculations have been completed. If the determination in step 120 is affirmative, the operation proceeds to step 122, while if the determination in step 120 is negative, the operation returns to step 110 to perform the independent calculations of deformation of the tire model and of the fluid again for 1 msec each. Incidentally, it is possible to cite the following examples as specific methods of the determination.

(1) In a case where the tire model is a nonrolling model, the calculation is repeated until the physical quantities which are objects of the calculation (fluid reaction force, pressure, flow velocity, and the like) can be regarded as being in steady states (states in which the physical quantities can be regarded as being the same as those of previous calculation). When the calculation is completed, the determination becomes affirmative. Alternatively, the calculation is repeated until the deformation of the tire model can be regarded as being in the steady state. Further, the calculation may end when a predetermined time has elapsed. The predetermined time in this case is preferably 100 msec or more, and more preferably 300 msec or more.

(2) In a case where the tire model is a rolling model, the calculation is repeated until the deformation of the portion which is subjected to analysis is finished, and when the calculation is completed, the determination becomes affirmative. The deformation of the portion which is subjected to analysis refers to the deformation from the time the tread portion of the smooth tire is brought into contact with the road surface model due to rolling until it moves away from the road surface model, or from the time the tread portion is brought into contact with the fluid model due to rolling until it comes into contact with the road surface model. This deformation of the portion which is subjected to analysis may be from the time the tire portion is brought into contact with each of the models after the tire has rolled one revolution or more. Further, the calculation may end when a predetermined time has elapsed. The predetermined time in this case is preferably 100 msec, and more preferably 300 msec or more.

Figure 14:
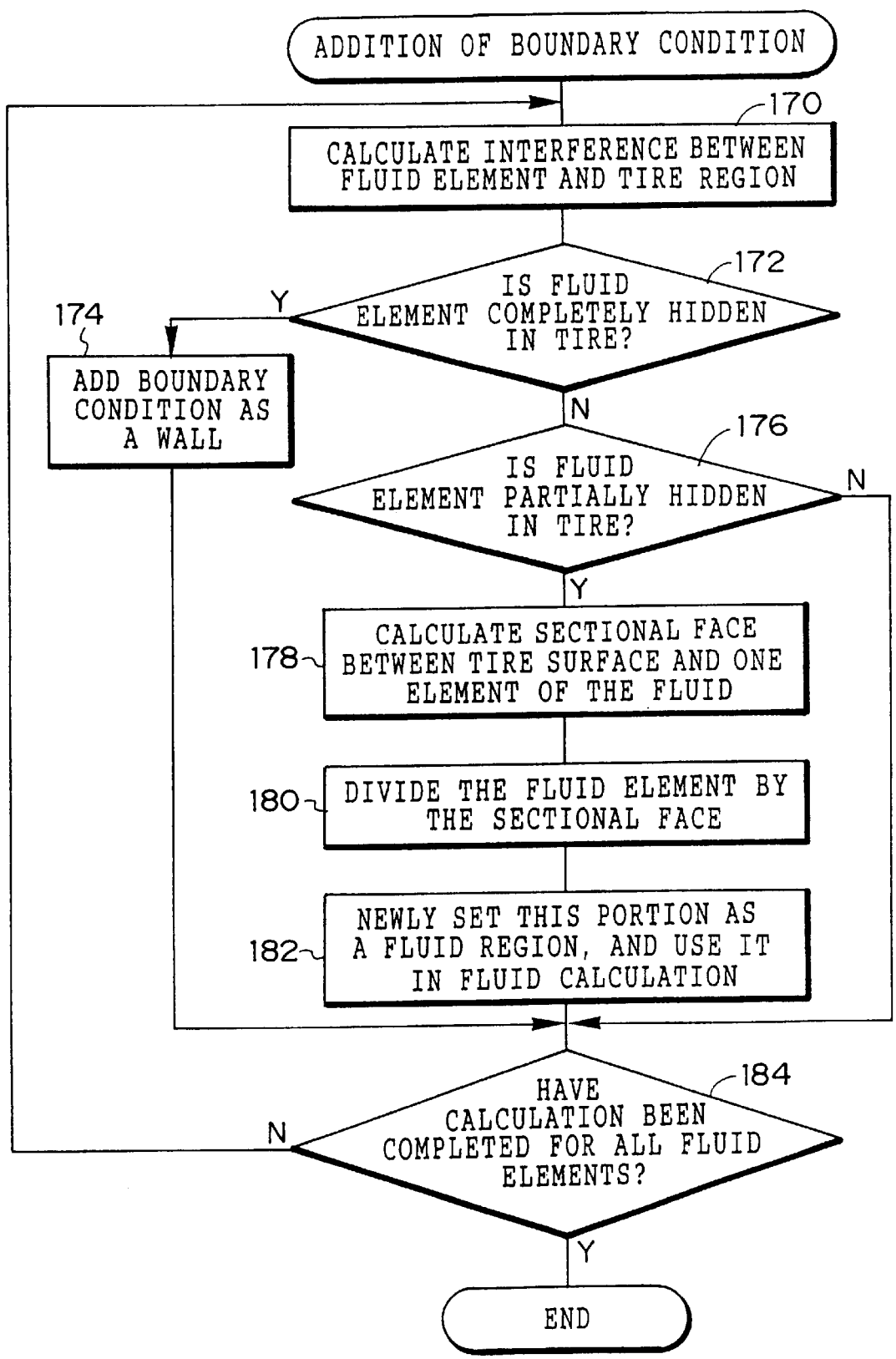
FIG. 14 is a flowchart illustrating the flow of boundary-condition addition processing.
Figure 15:
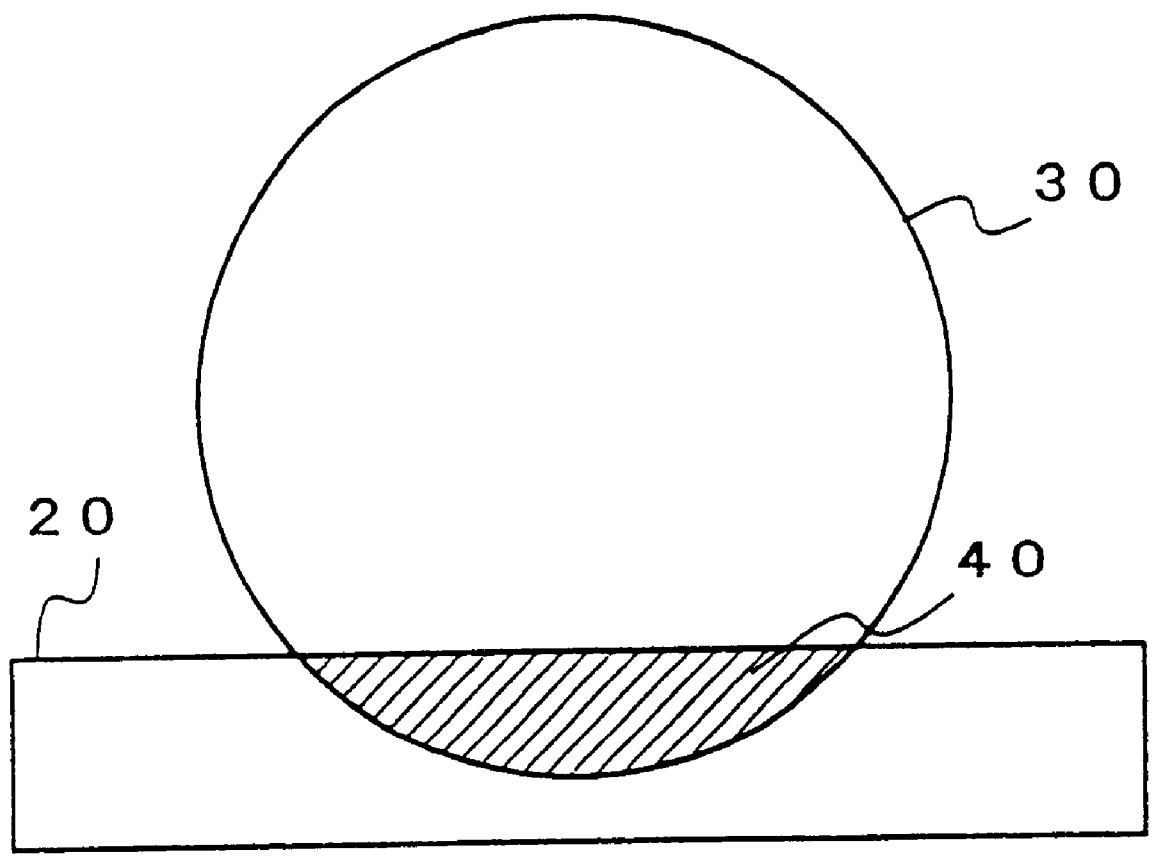
FIG. 15 is a diagram illustrating an interfering region between the tire model and the fluid model.

Here, a detailed description will be given of step 118. In the processing in step 118 in which the boundary surface between the tire model and the fluid model is recognized in correspondence with the deformation of the tire model, and the boundary conditions are added, the processing routine shown in FIG. 14 is executed. First, in step 170, in order to determine which portion of the fluid model (fluid region) 20 is hidden in a tire model 30, an interfering portion 40 between the fluid model 20 and the tire model 30 is calculated. This calculation is performed with respect to all the elements (fluid elements) obtained by dividing up the fluid model 20, i.e., the fluid region, into subregions (see FIG. 15).

In an ensuing step 172, a determination is made as to whether or not the fluid element is completely hidden in the tire model. If the fluid element is completely hidden in the tire model, the determination in step 172 becomes affirmative, and the operation proceeds to step 174. In this step 174, since this element is inside the tire model and influx and efflux of the fluid does not take place, a boundary condition as a wall is added thereto.

On the other hand, if the determination in step 172 is negative, the operation proceeds to step 176 to determine whether or not a portion of the fluid element is hidden in the tire model. If a portion of the fluid element is hidden in the tire model, the determination in step 176 becomes affirmative, and in an ensuing step 178 a sectional face, i.e., a plane which bisects the fluid element by a surface 32 of the tire model 30, is calculated (see FIGS. 16A and 16B). In an ensuing step 180, a fluid element 22 is further divided by this sectional face. In an ensuing step 182, a region 22A which is not hidden in the tire model among the divided fluid elements is defined newly as a fluid model (fluid region), and this portion is used in the calculation of the fluid. In addition, since the plane which corresponds to the sectional face of the new fluid element is in contact with the tire model, a boundary condition as a wall is added thereto.

It should be noted that since the division of the divided fluid elements into further smaller portions leads to an increase in the calculation time and is therefore not desirable. Hence, it is preferable to set a limit to the division of the fluid elements (in this case, a limit such that a once-divided element is not subdivided).

In a subsequent step 184, a determination is made as to whether or not the above-described processing has been carried out for all the fluid elements. If an unprocessed fluid element remains, the determination in step 184 becomes negative, and the operation returns to step 170. On the other hand, if the above-described processing has been completed for all the fluid elements, this routine ends. Consequently, it is possible to incorporate the surface configuration of the tire model into the calculation of the fluid as boundary conditions.

Thus, the technique whereby the tire model and the fluid model can be defined in a partially overlapping manner makes it possible to substantially reduce the time and trouble required in the construction of a computed model. Furthermore, by bisecting the fluid element which is partially hidden in the tire model, it is possible to use a large initial fluid mesh, with the result that it is possible to prevent an increase in the calculation time due to an increase in the number of fluid elements, thereby making it possible to perform the performance estimation efficiently.

After thus performing analysis A, analysis B, and the change in the boundary conditions for their linkage, the operation returns to analysis A, then analysis B, and the calculation is performed under the changed boundary conditions. This step is repeated until the calculation is completed, and when the calculation is completed, the determination in step 120 becomes affirmative, and the operation proceeds to step 122 to output the results of the calculation as the results of estimation and evaluate the results of estimation.

A description has been given above of the case in which analysis A, analysis B, and the change in boundary conditions are repeated, and when the calculation is completed, the results of the calculation are outputted and the results of estimation are evaluated. However, while calculation is being made, the results of the calculation at that point of time may be outputted, and this output may be evaluated, or a number of outputs may be evaluated consecutively. In other words, outputs and evaluations may be made during the calculation.

Figure 19:
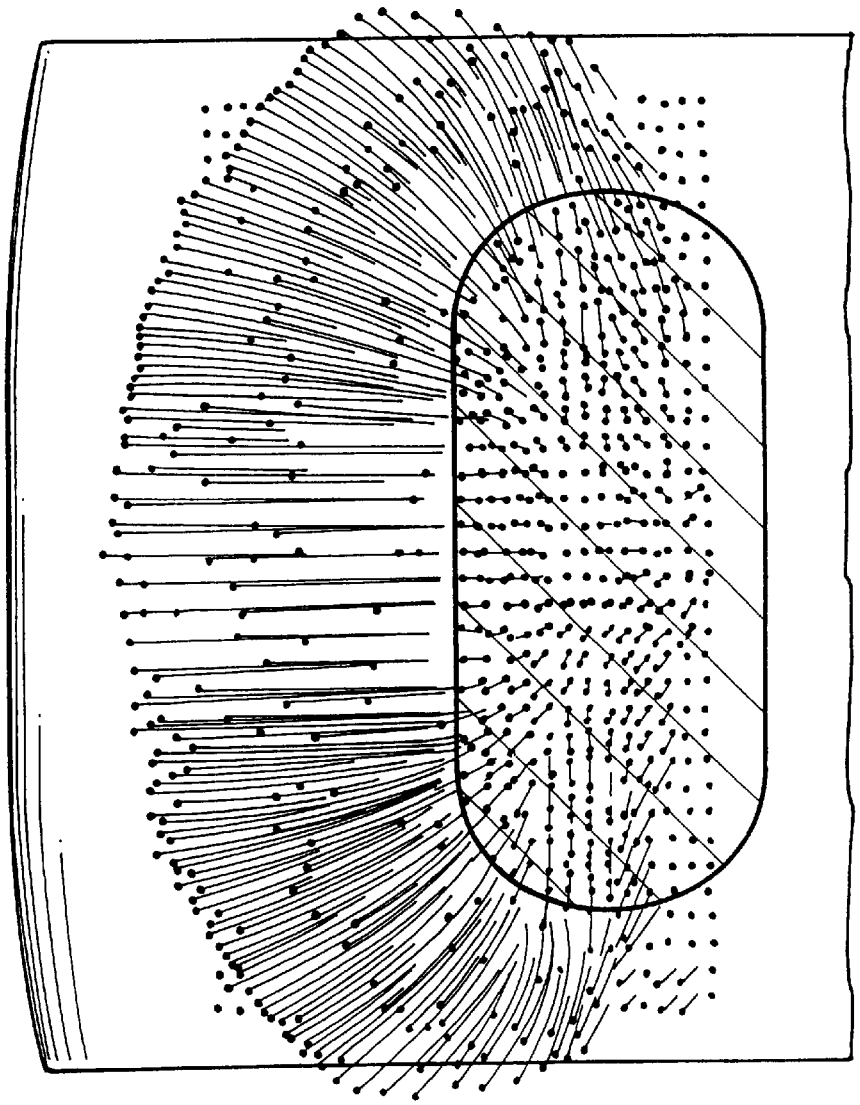
FIG. 19 is a diagram illustrating streamlines formed by the smooth tire.

In the present embodiment, main travel paths of the fluid, i.e., streamlines, are used as the output of the results of estimation. Streamlines are typical travel paths along which a part of the fluid is scattered (splashed) by the fluid model being deformed due to the rolling of the tire model, or along which a part of the pressure of the fluid is shifted by the fluid model being deformed due to the rolling of the tire model. A specific example of the output of the results of estimation is shown in FIG. 19. As can be seen from the drawing, streamlines are radially formed from the ground contact range of a tire model for a smooth tire in the advance direction (i.e., in a direction of arrow A in FIG. 19).

Figure 20:
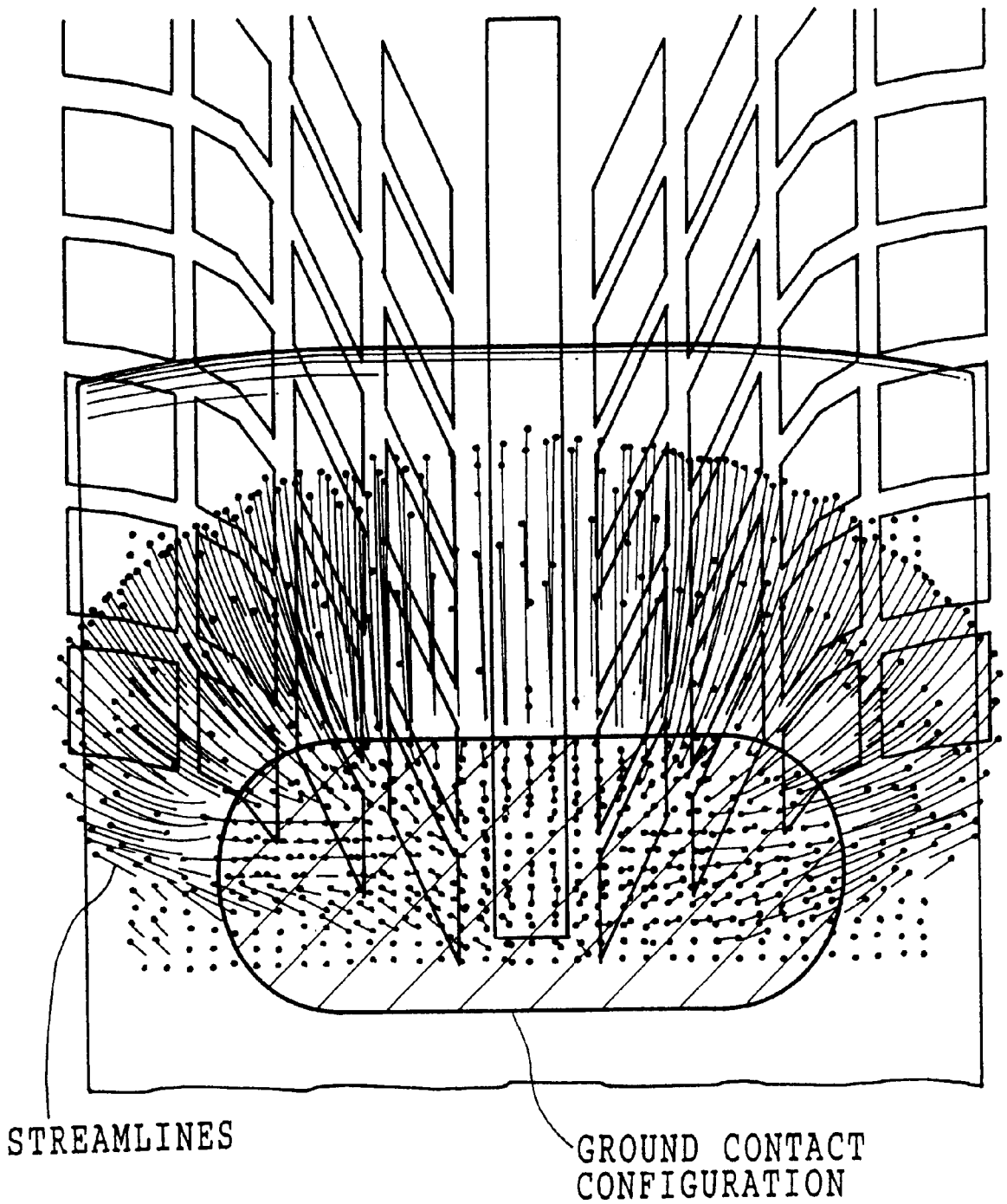
FIG. 20 is a diagram illustrating a state in which the streamlines and a pattern of the smooth tire overlap.
Figure 21:
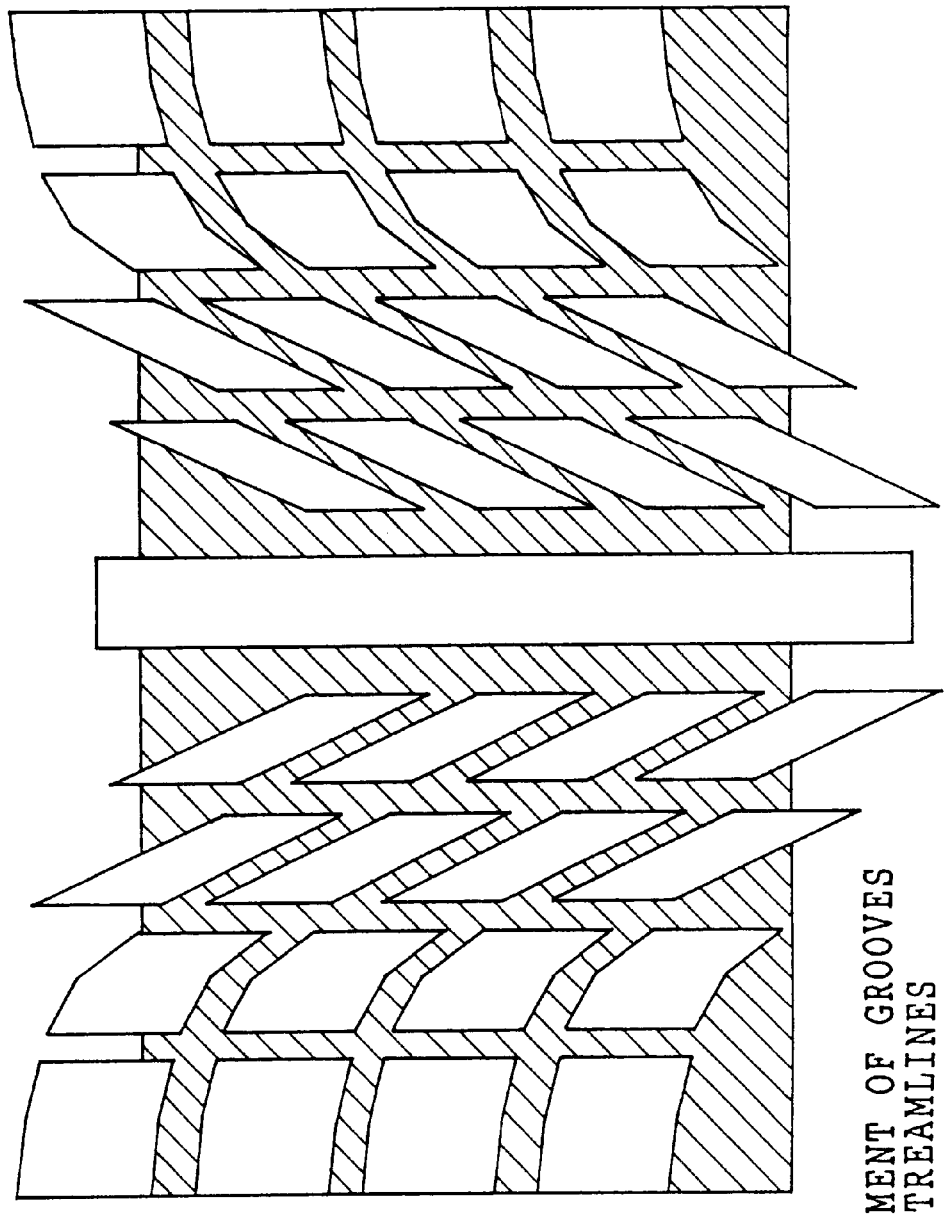
FIG. 21 is a diagram illustrating the pattern.

Subsequently, in step 124, a pattern for the tread portion is derived from the aforementioned results of estimation. In this step 124, grooves are formed along the streamlines obtained above. This is because the directions of the streamlines are directions in which fluid (e.g., water) is estimated to flow, and by forming grooves in these directions, a pattern is formed which makes movement of the fluid such as drainage satisfactory. By the pattern from the aforementioned results of estimation, grooves are newly formed on a smooth tire or grooves along the streamlines determined from the results of estimation are added to a standard pattern or other design pattern determined in advance. A pattern derived in this manner is shown in FIG. 21. Further, a state in which the streamlines which are the results of the estimation and the pattern in FIG. 21 overlap is shown in FIG. 20. As can be understood from FIG. 20, the grooves of the tire model are formed so as to be substantially along the streamlines.

In a subsequent step 126, the pattern derived above is developed in the circumferential direction of the tire such that a (whole) tire model with pattern is constructed. As a result, it is possible to form a tire model with pattern in which grooves are formed along the streamlines and which makes movement of the fluid such as drainage satisfactory.

Figure 5:
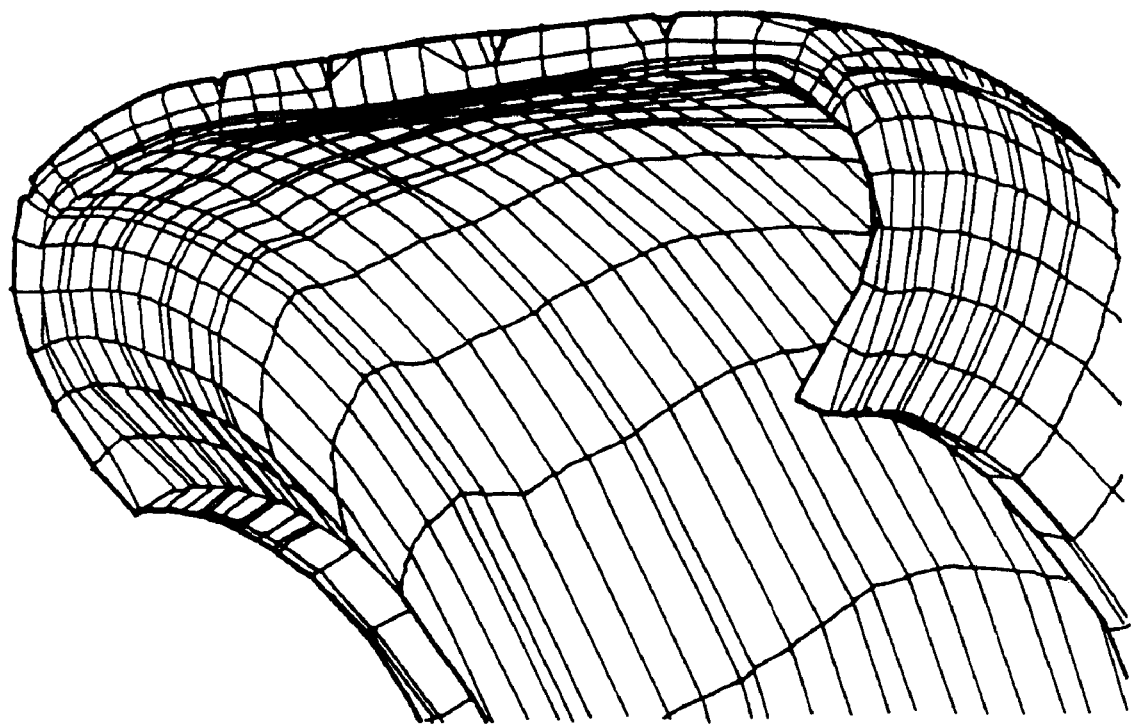
FIG. 5 is a perspective view illustrating a three-dimensional model of the tire.
Figure 6:
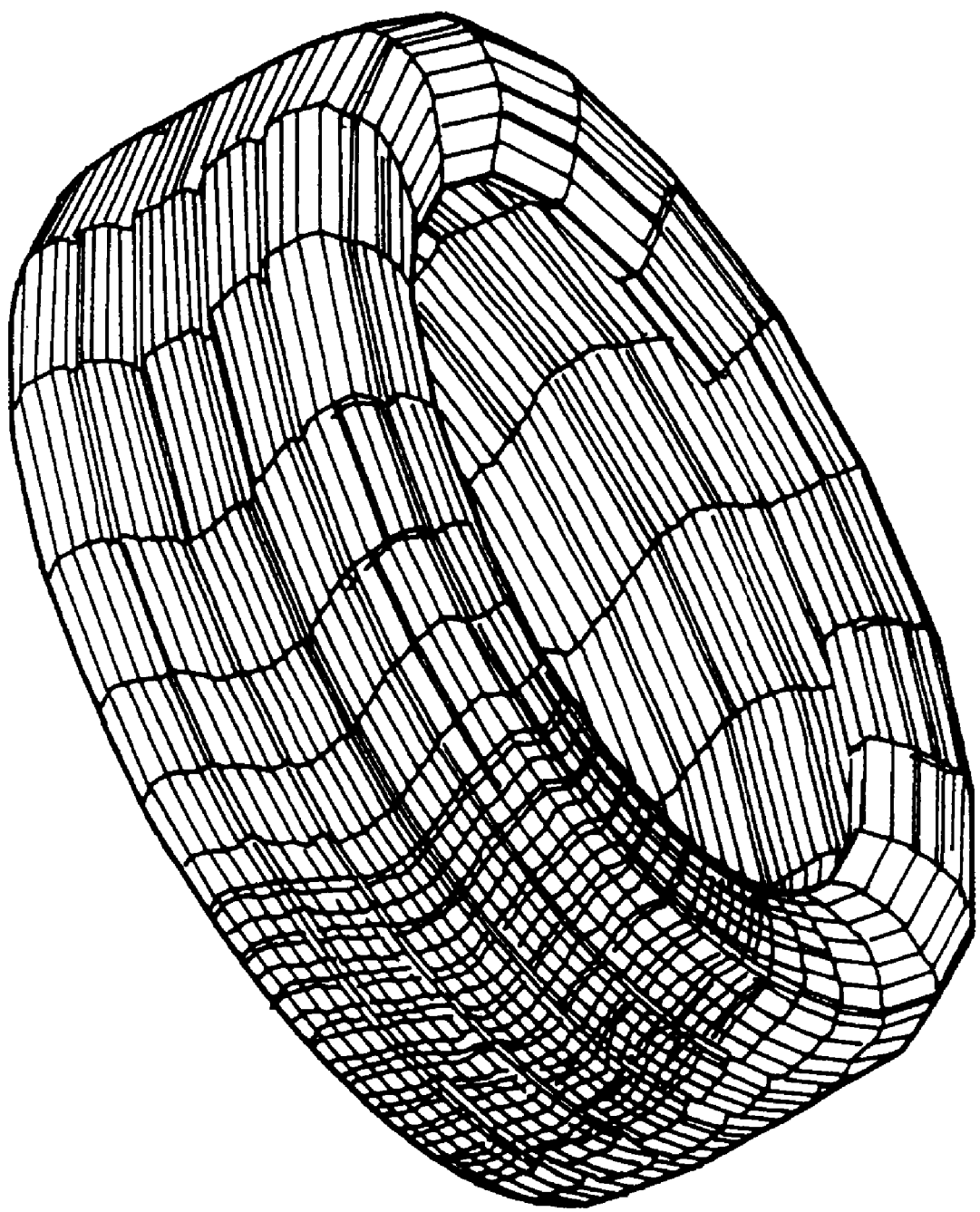
FIG. 6 is a perspective view illustrating an image of a modeled pattern.

In a subsequent step 128, performance of the aforementioned tire model with pattern is evaluated. In this step 128, taking into consideration the deformation and the like of the tire model due to rolling or nonrolling of the tire model described above, the tire performance is estimated, and the results thereof are outputted. Specifically, steps 102 through 122 in FIG. 2 are carried out. Since the tire model has pattern, the pattern is also modeled in the processing of step 102. This processing is similar to that shown in FIG. 3, and a 3D model of the tire model obtained by three-dimensionally modeling the tire model is shown in FIG. 5. Subsequently, the pattern is modeled. Modeling of the pattern is carried out in accordance with either of the following procedures 1 or 2. The pattern which is modeled in accordance with either of the procedures 1 or 2 is shown in FIG. 6. Procedure 1: A part of or the whole of the pattern is separately modeled and is mounted onto the tire model as the tread portion. Procedure 2: At the time the tire cross section data is developed in the circumferential direction of the tire, the pattern is constructed taking the rib and lug components into consideration.

After the tire model has been constructed in the above-described manner, the processing starting with step 104 is performed in the same way as described above.

Figure 22:
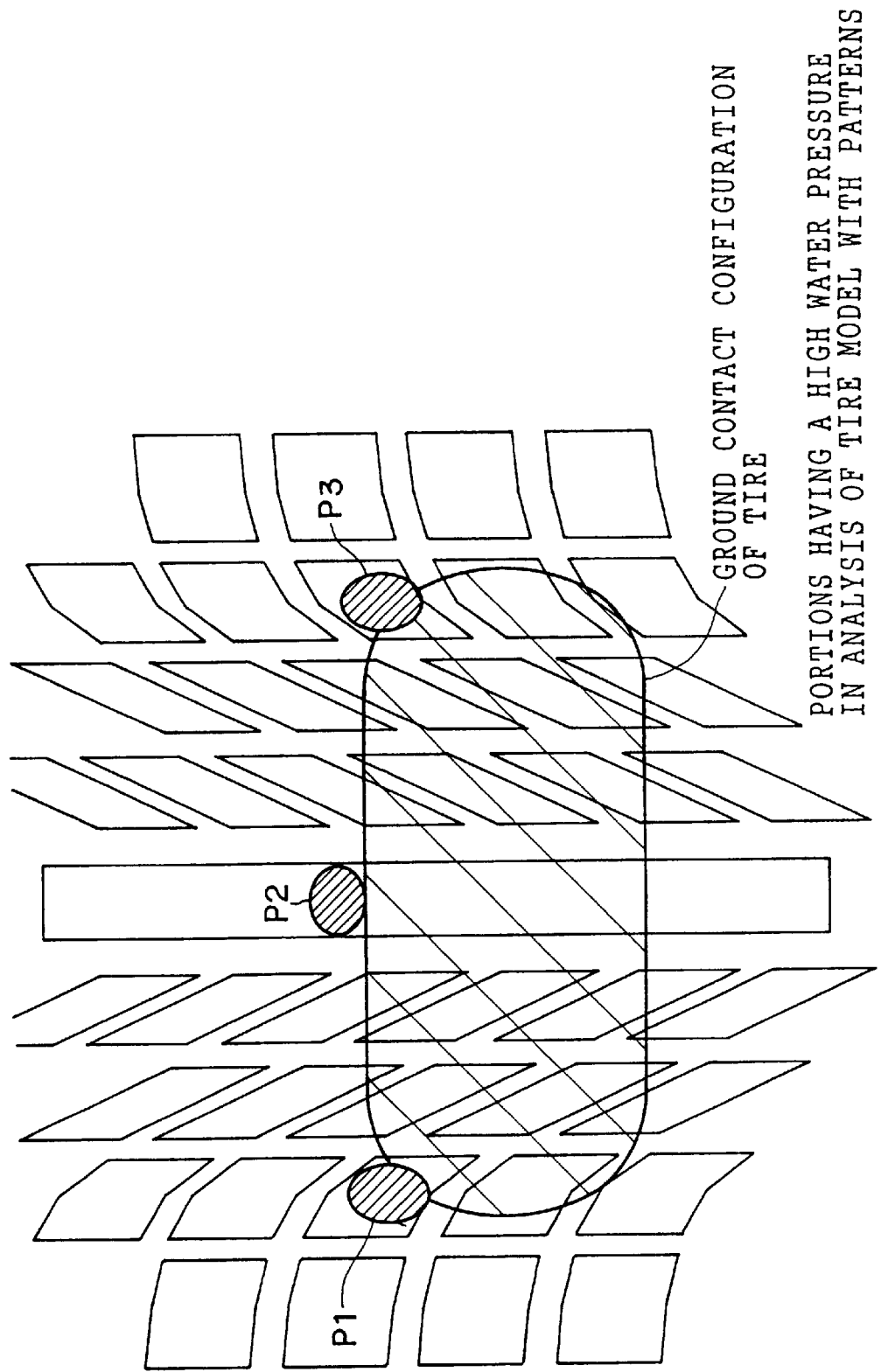
FIG. 22 is an explanatory diagram for explaining high water-pressure positions.

Next, the results of estimation are outputted in the same manner as in step 122. In this case, the pressure distribution of the fluid is used in the present embodiment. By evaluating the pressure distribution (e.g., by determining whether or not the pressure is a predetermined value or less), a determination can be made as to whether or not the grooves formed in the above manner function properly. FIG. 22 shows the pressure distribution which is the result of estimation, and in this drawing, portions P1, P2, and P3 respectively have a fluid pressure (water pressure) higher than a predetermined pressure.

As the output of the estimation results, it is possible to use values or distributions of the flow force, the flow velocity, the volume of flow, pressure, energy, and the like. Specific examples of the output of the estimation results include the output of fluid reaction force, the output and visualization of the fluid flow, and the output and visualization of the distribution of water pressure. The fluid reaction force is the force with which the fluid (e.g., water) pushes the tire upward. The fluid flow can be calculated from the velocity vector of the fluid, and if the fluid flow, the tire model and its vicinities, and the pattern and its vicinities are altogether represented in a diagram (line map) or the like, the fluid flow can be visualized. As for the visualization of the distribution of water pressure of the fluid, it suffices if the tire model and its vicinities and the pattern and its vicinities are plotted in a diagram, and values of water pressure are represented on the diagram in corresponding colors and patterns (see FIG. 20).

In addition, as the evaluation, it is possible to adopt, among others, a subjective evaluation (determination as to whether the fluid is flowing smoothly as the whole, the presence of disturbance in the direction of flow, and the like), as well as such criteria as whether pressure and energy have not increased locally, whether a necessary volume of flow has been obtained, whether hydrodynamic force has not increased, whether the flow has not stagnated, and the like. Further, in the case of the pattern, it is possible to adopt a criterion such as whether the fluid is flowing along the grooves. In addition, in the case of the tire model, it is possible to adopt a criterion such as whether the amount of forward spray is large in which case, as the tire rotates, the tire, at its ground contact surface and in its vicinity, nips the fluid such as water and pushes it forward, and whether the fluid is flowing laterally on the road surface.

It should be noted that, as for the evaluation of the results of estimation, an evaluation value can be determined by numerically expressing to what extent the output values and the distribution of the output values agree with predetermined allowable values and allowable characteristics by using the distribution of the output values and the output values of the results of estimation.

Next, in step 130, from the above-described evaluation of the results of estimation, i.e., the pressure distribution, a determination is made as to whether or not the grooves function properly (i.e., a determination is made as to whether or not the estimated performance is satisfactory), and if a portion having a large value in the pressure distribution is present, the tire model is modified by providing sipes or notches at blocks around the portion. After this modification of the tire model, the tire model may be evaluated and modified again by carrying out the processing in step 128. This determination may be made by a user giving instructions via a keyboard. Alternatively, setting an allowable range for the aforementioned evaluation value in advance, a determination may be made that the estimated performance is satisfactory if the evaluation value of the results of estimation falls within the allowable range.

Figure 23:
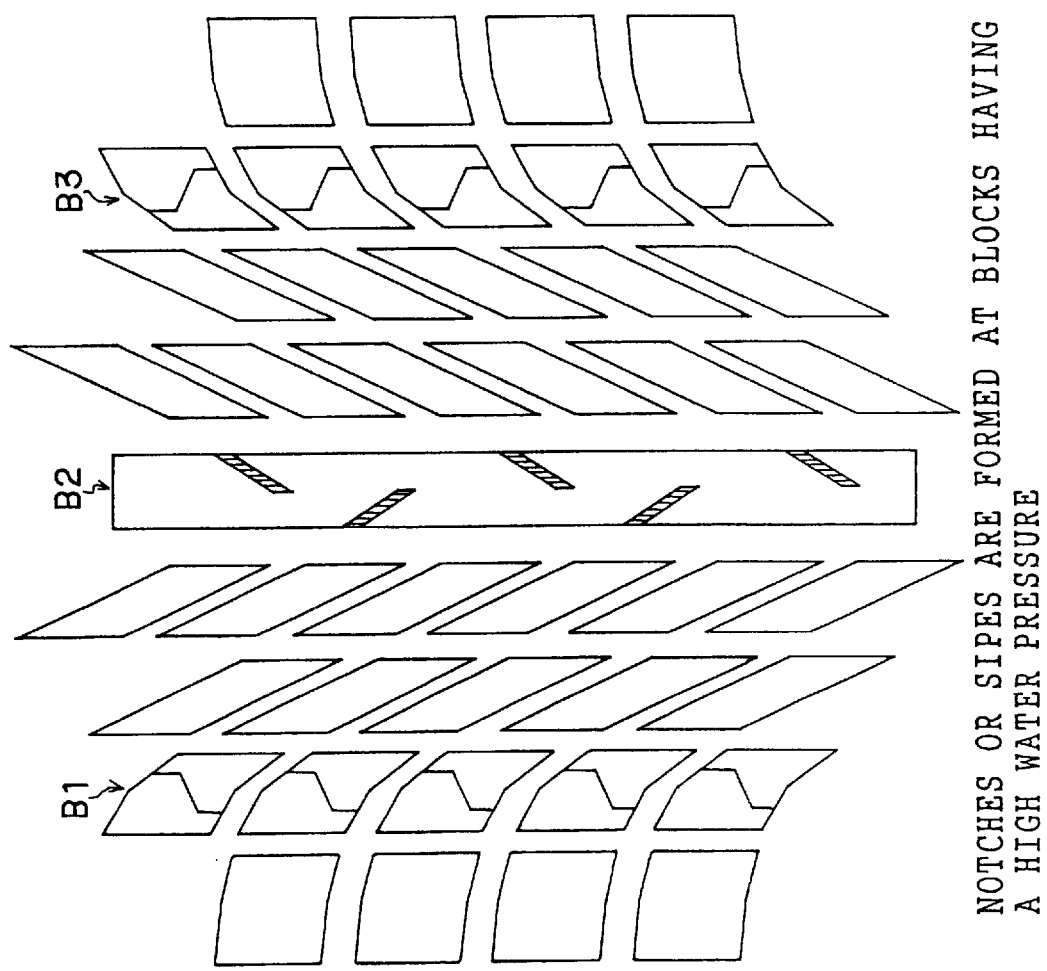
FIG. 23 is an explanatory diagram for explaining a modification to the blocks near the high water-pressure positions.

In the example shown in FIG. 22, the portions P1, P2, and P3 each have a high fluid pressure. Accordingly, as shown in FIG. 23, the tire model is modified in such a manner that sipes or notches are provided at blocks BI, B2, and B3 which correspond to the high fluid-pressure portions P1, P2, and P3, respectively. As a result, the pressure distribution is made uniform.

In a subsequent step 132, the modified tire model is adopted as the draft design, and this routine ends. In adopting the draft design in step 132, the draft design may be outputted (displayed or printed out) to show its satisfactory performance, and the data of the draft design may be stored.

Second Embodiment

It should be noted that, since the arrangement of a second embodiment is substantially similar to that of the above-described embodiment, identical portions will be denoted by the same reference numerals, and a detailed description thereof will be omitted. In addition, water is used as the fluid in this embodiment.

In the above-described embodiment, a case has been described in which a tire is designed which enables easy movement of the fluid by grooves being formed along the streamlines. The present second embodiment is provided to make the pressure distribution of the fluid more uniform, i.e., to preferentially eliminate high pressure portions. In other words, attention is paid to the distribution of water pressure, and a tire is designed in which drainage performance is taken into consideration.

Figure 24:
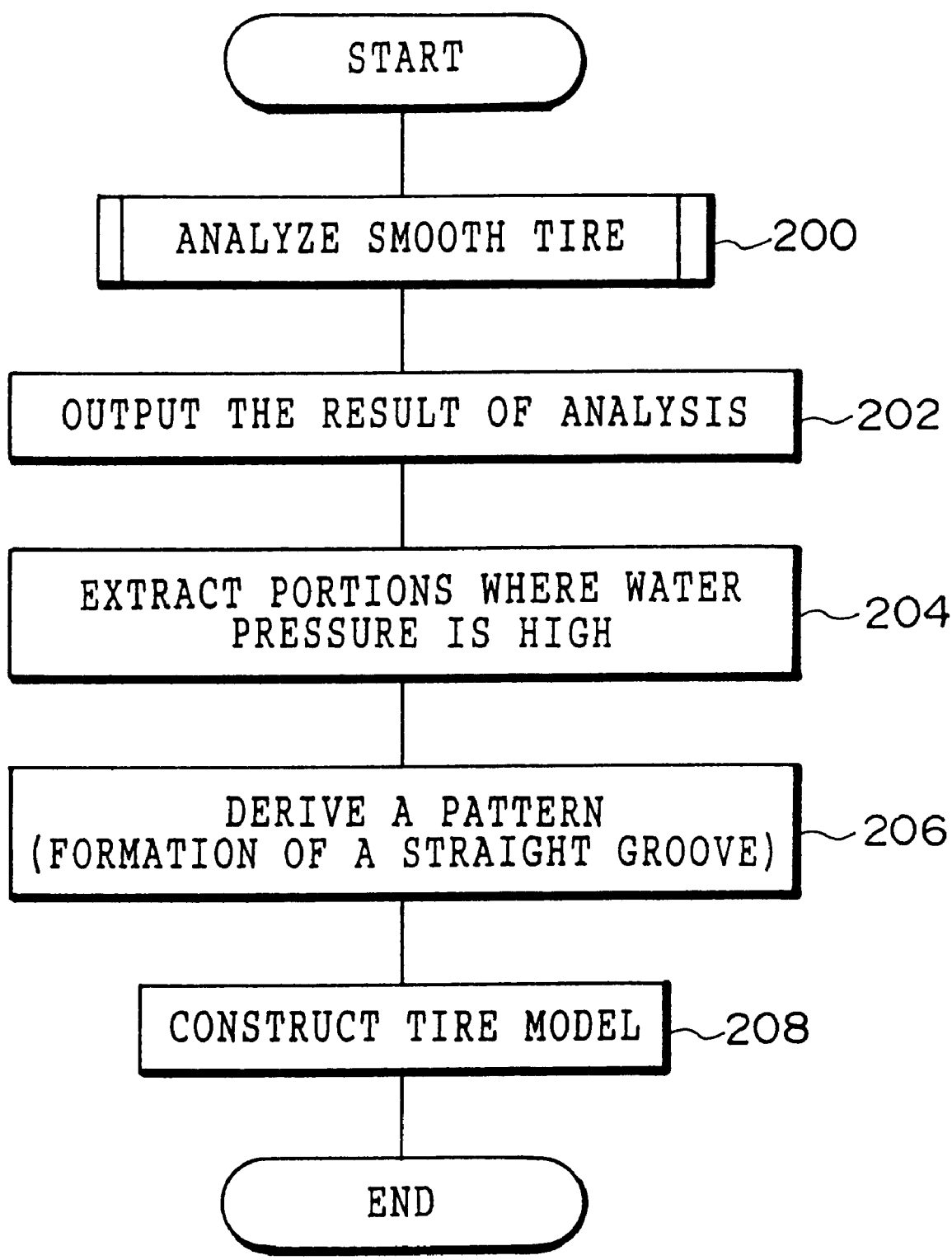
FIG. 24 is a flowchart illustrating the flow of processing of a program for designing a pneumatic tire in accordance with a second embodiment of the present invention.
Figure 25:
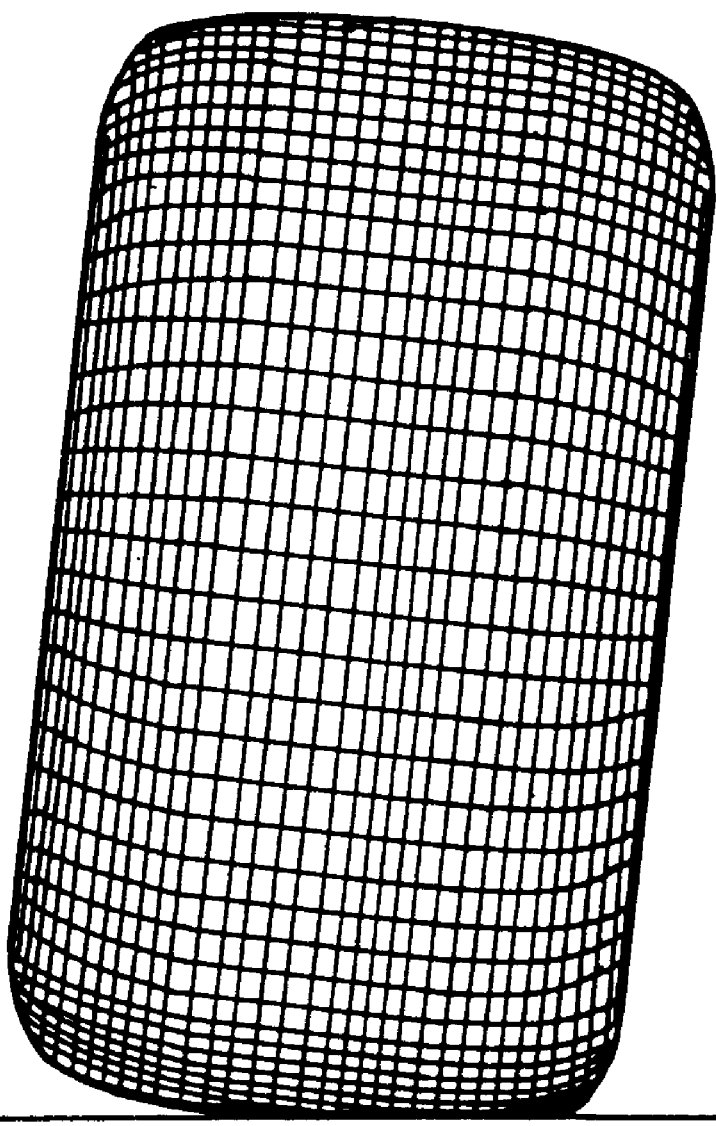
FIG. 25 is a diagram illustrating a tire model in an inclined state.

Operation of the present embodiment will now be described. In the present embodiment, the processing routine in FIG. 24 is executed. First, in step 200, analysis of a smooth tire is carried out in the same way as in the above-described embodiment. Specifically, a tire model and a fluid model are constructed first, a road surface model is constructed, and then the condition of the road surface is inputted by selecting the coefficient of friction $\mu$ (steps 100 to 106 in FIG. 2). The tire model in this case is a smooth tire. Further, a pattern model and a belt model which is mounted onto a pattern are also constructed. In this embodiment, as shown in FIG. 25, taking into consideration the camber angle which conforms to the state in which a tire is mounted to a vehicle and changes in accordance with steering, a predetermined camber angle is imparted to the tire model. Subsequently, boundary conditions at the time of rolling or nonrolling of the tire are set, and the calculation of deformation of the tire and the calculation of the fluid are performed (steps 108 to 120 in FIG. 2).

Figure 26:
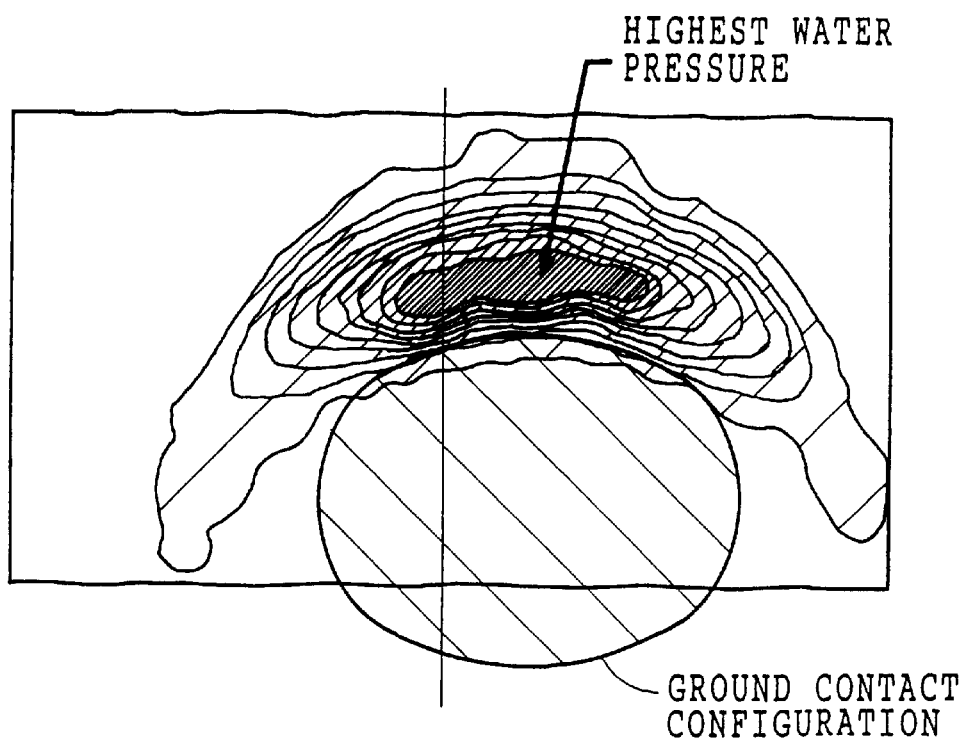
FIG. 26 is a diagram illustrating the distribution of water pressure near the ground contact surface of the tire.

Next, in step 202, the result of analysis of the smooth tire model is outputted. In this step 202, the distribution of water pressure is outputted as the analysis result. In a subsequent step 204, portions where water pressure is high are extracted. FIG. 26 shows a distribution of water pressure in accordance with the ground contact configuration of the tire. As can be seen from the drawing, the portion having the highest water pressure is away from the central portion of the tire in a direction in which the tire is inclined. Namely, portions shifted by imparting the camber angle are high water-pressure portions.

Figure 27:
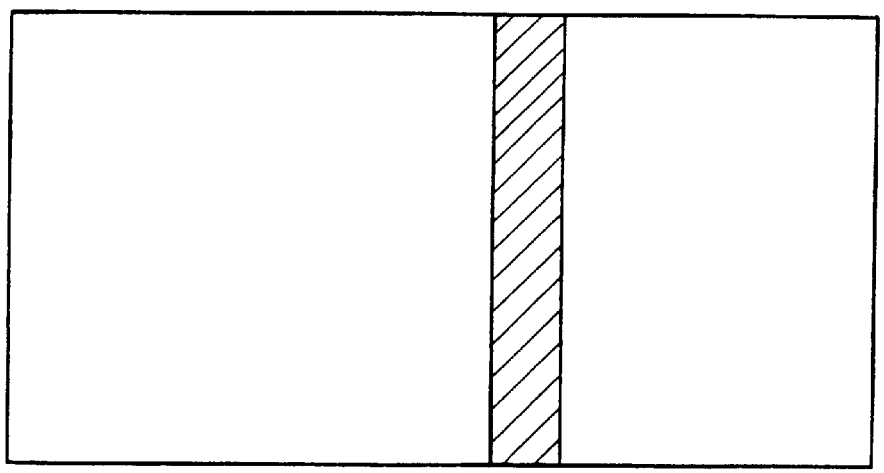
FIG. 27 is a diagram illustrating the positional relationship of a groove formed on the tire.

In an ensuing step 206, a pattern is derived from the results of the above step 204 (i.e., high water-pressure portions). Namely, as shown in FIG. 27, a straight groove is formed in high water-pressure portions. This straight groove is a groove which is successively disposed in the circumferential direction of the tire, and is formed in the widthwise direction of the tire at a position corresponding to the high water-pressure portions obtained from the result of analysis. Subsequently, the formed straight groove is overlapped with the tire pattern such that a pattern is derived (see FIG. 28).

In a subsequent step 208, a tire model is constructed in the same way as in the above-described embodiment by using the formed pattern.

In this way, in the present embodiment, the smooth tire model is regarded as the basic model, and a straight groove is formed at the positions at which high water pressure is expected. Therefore, water collection due to high water pressure is suppressed, thereby making it possible to improve drainage performance.

Third Embodiment

It should be noted that, since the arrangement of a third embodiment is substantially similar to that of the above-described embodiments, identical portions will be denoted by the same reference numerals, and a detailed description thereof will be omitted. In addition, water is used as the fluid in this embodiment.

In the above-described embodiments, there have been described a case in which a tire enabling easy movement of the fluid by grooves formed along the streamlines is designed and a case in which a tire having a straight groove formed at high water-pressure positions thereof is designed. In the present embodiment, a tire whose drainage performance is improved by combining these cases is designed.

Figure 29:
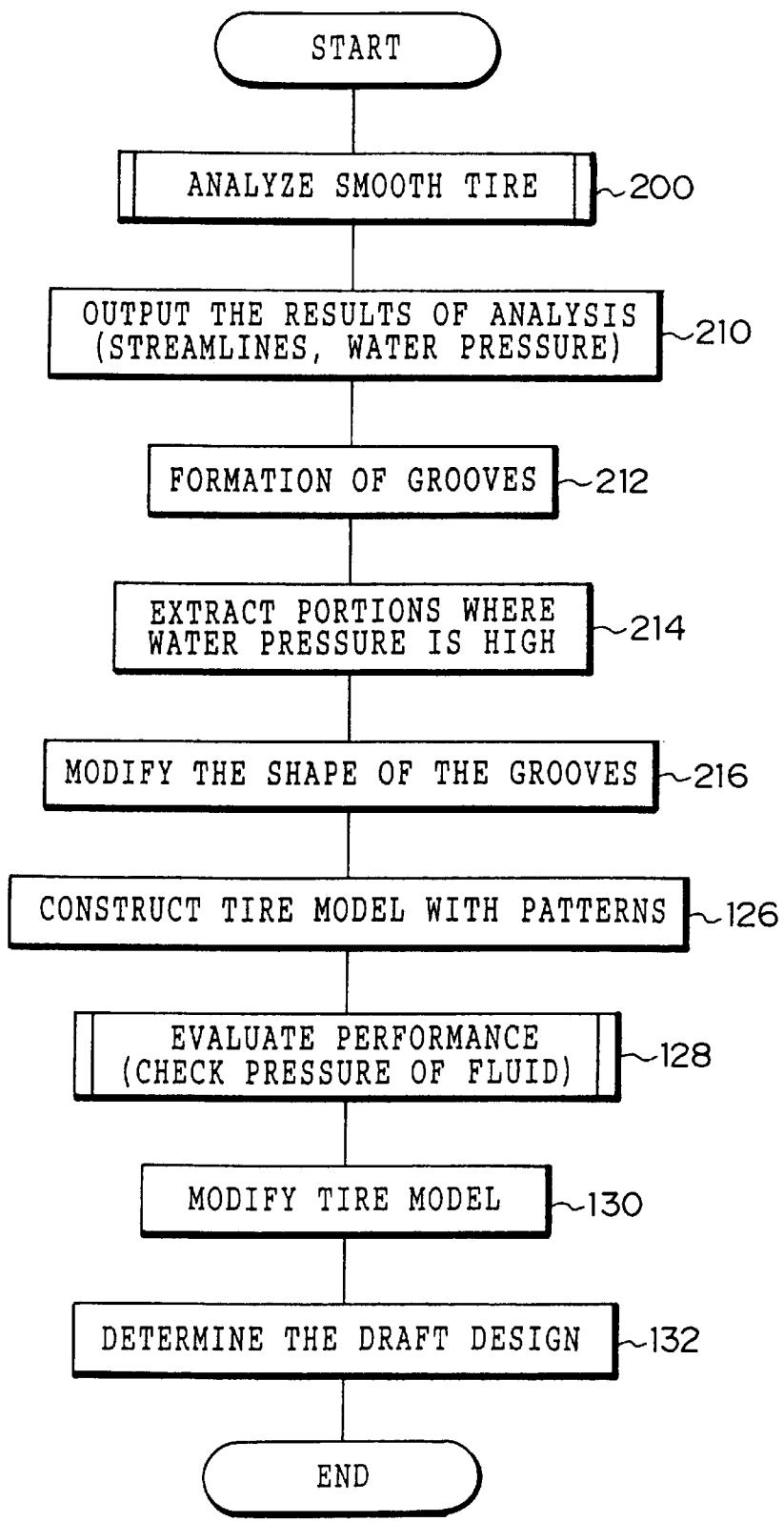
FIG. 29 is a flowchart illustrating the flow of processing of a program for designing a pneumatic tire in accordance with a third embodiment of the present invention.

Operation of the present embodiment will now be described. First, in the present embodiment, the processing routine in FIG. 29 is executed, and analysis of a smooth tire is carried out in the same way as in the above-described embodiments (step 200). After the calculation of deformation of the tire model and the calculation of the fluid have been performed, the results of analysis of the smooth tire model are outputted in step 210. In this step 210, streamlines and the distribution of water pressure are outputted as the results of analysis. In a subsequent step 212, grooves are formed on the basis of the results of analysis. Namely, based on the output of the results of estimation, grooves are formed along the streamlines, which are main travel paths of the fluid (see FIG. 19). As described above, this is because the directions in which the streamlines run are the directions in which the fluid (e.g., water) is expected to flow, and by forming the grooves in these directions, patterns which make movement of the fluid such as drainage satisfactory are formed. In a subsequent step 214, portions having a high water pressure are extracted. In a subsequent step 216, the grooves which are located near the high water-pressure portions are modified. Namely, water collects at a position having the highest water pressure, thereby deteriorating drainage performance. Therefore, the volume of the grooves located near high water-pressure portions is made larger than that of grooves located at other portions. For example, at least one of the width and the depth of the groove is increased. The volume of the groove is preferably determined in correspondence with water pressure.

Pattern is derived in accordance with the grooves determined in the above-described manner (i.e., the grooves which are formed along the streamlines and whose volume is increased at the high water-pressure portions), and a tire model with pattern is constructed (step 126).

Next, performance of the aforementioned tire model with pattern is evaluated (step 128). In this step 128, taking into consideration deformation and the like of the tire model due to rolling or nonrolling of the tire model described above, the tire performance is estimated, and the result is outputted (processings in steps 102 to 122 in FIG. 2). Since the tire model has pattern, the pattern is also modeled.

Next (in step 130), from the above-described evaluation of the result of estimation, i.e., the pressure distribution, a determination is made as to whether or not the grooves function properly (i.e., a determination is made as to whether or not the estimated performance is satisfactory), and if streamlines which do not correspond to grooves are present, or a portion having a large value in the pressure distribution is present, the tire model is modified by changing the width or depth of the grooves or providing sipes or notches at blocks around the portion. The tire model may be evaluated and modified again after this modification of the tire model. In a subsequent step 132, the modified tire model is adopted as the draft design, and the processing routine ends.

In this way, in the present embodiment, the smooth tire model is regarded as the initial model, grooves are formed along the streamlines, and the volume of the grooves formed at positions at which high water pressure is expected is made large. Therefore, water collection due to high water pressure is suppressed, thereby making it possible to improve drainage performance.

EXAMPLES

Hereinafter, the results of experiments are shown as Examples. In the experiments, tires designed in accordance with the embodiments were actually manufactured, and performance of these tires was respectively measured.

Figure 30A:
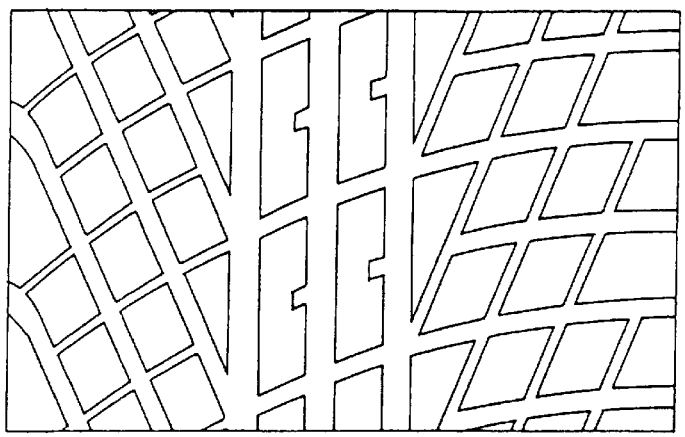
FIG. 30A is a diagram illustrating groove shapes formed in accordance with a conventional designing method in Comparative Example.
Figure 30B:
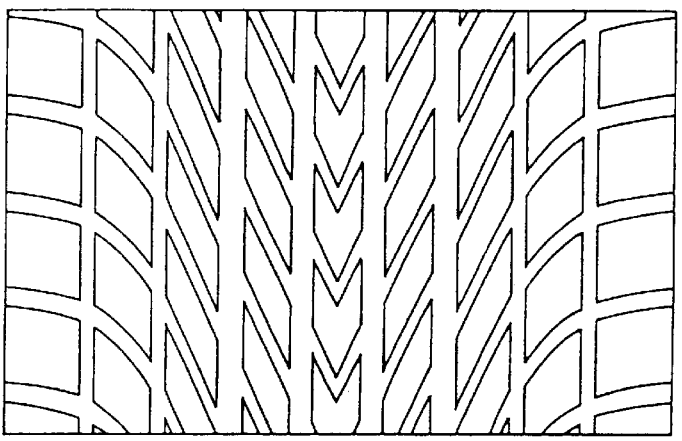
FIG. 30B is a diagram illustrating groove shapes which coincide with streamlines in Example 1.
Figure 30C:
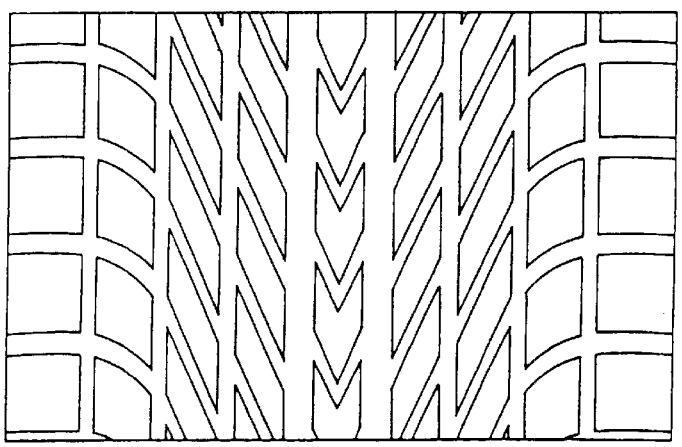
FIG. 30C is a diagram illustrating grooves in Example 2 which coincide with streamlines and have a volume corresponding to the water pressure.

FIG. 30A shows Comparative Example, which is a normally designed tire, i.e., a tire not having grooves formed along streamlines (a tire whose streamlines do not coincide with grooves). FIG. 30B shows Example 1, which is a tire obtained in accordance with the tire designing method in which grooves are formed along streamlines. FIG. 30C shows Example 2, which is a tire obtained in accordance with the tire designing method in which grooves are formed along streamlines and the volume of the grooves at high water-pressure portions is increased.

[Hydroplaning Index]

Comparative Example 100

Example 1 55

Example 2 50

From the above results, it can be understood that hydroplaning index decreases and hydroplaning performance, i.e., drainage performance, improves in the order of Comparative Example, Example 1, and Example 2.

As described above, in accordance with the present invention, there can be obtained an effect that tires can be designed by taking into consideration the behavior of a fluid such as drainage performance, on-snow performance, noise performance, and the like, under circumstances in which tires are actually used in the presence of the fluid. This leads to improvement in efficiency of tire development. Further, an effect can be obtained that tires having satisfactory performance can be obtained.

What is claimed is:

1. A method of designing a tire comprising the steps of:
   (a) determining a tire model having no pattern configuration to which deformation can be imparted by at least one of ground contact and rolling, and a fluid model at least partially filled with a fluid which comes into contact with at least a portion of the tire model;
   (b) performing deformation calculation of the tire model based on said at least one of ground contact and rolling of the tire model;
   (c) performing fluid calculation of the fluid model based on said at least one of ground contact and rolling of the tire model; and
   (d) estimating behavior of the fluid model due to said at least one of ground contact and rolling of the tire model, and designing a pattern configuration for the tire model based on the behavior of the fluid model.

2. The method of claim 1, wherein, in the step (d), at least one streamline of the fluid model, as the behavior of the fluid model, is estimated, and at least one groove is formed on the tire model on the basis of a direction in which the streamline extends.

3. The method of claim 1, wherein, in the step (d), a pressure distribution of the fluid model, as the behavior of the fluid model, is estimated, and at least one groove is formed on the tire model on the basis of the pressure distribution of the fluid model.

4. The method of claim 3, wherein, in the step (d), at least one substantially straight groove is formed on the tire model in a circumferential direction thereof on the basis of the pressure distribution of the fluid model.

5. The method of claim 3, wherein, in the step (d), a volume of the groove formed on the tire model is determined on the basis of the pressure distribution of the fluid model.

6. The method of claim 1, wherein re-execution of the steps (b), (c) and (d) is done using the tire model having the pattern configuration designed in the step (d), and at least one of a notch and a sipe is formed on the tire model on the basis of the behavior of the fluid model estimated in the re-execution of the steps (b), (c) and (d).

7. The method of claim 1 further comprising the steps of:
   (1) identifying a boundary surface between the tire model after the deformation calculation in the step (b) and the fluid model after the fluid calculation in the step (c);
   (2) imparting a boundary condition, relating to the identified boundary surface, to the tire model and the fluid model; and
   (3) performing deformation calculation of the tire model and fluid calculation of the fluid model,
      wherein the steps of identifying a boundary surface, imparting a boundary condition, and performing deformation calculation of the tire model and fluid calculation of the fluid model are repeated until the fluid model assumes a state of pseudo flow.

8. The method of claim 7, further comprising the step of determining a physical quantity present in at least one of the tire model and the fluid model obtained in the steps (1) to (3), wherein in the step (d), the behavior of the fluid model is estimated on the basis of the physical quantity.

9. The method of claim 1, wherein the step (a) further includes determining a road surface model in contact with the fluid model.

10. The method of claim 1, wherein, in the step (b), the deformation calculation is repeated for no more than a predetermined time duration.

11. The method of claim 10, wherein the predetermined time duration is no more than 10 msec.

12. The method of claim 1, wherein, in the step (c), the fluid calculation is repeated for no more than a predetermined time duration.

13. The method of claim 12, wherein the predetermined time duration is no more than 10 msec.

14. The method of claim 7, wherein the steps (1)–(3) are carried out within a predetermined time duration.

15. The method of claim 14, wherein the predetermined time duration is no more than 10 msec.

16. The method of claim 1, wherein if the tire model is a rolling model, the step (a) includes providing an internal pressure to the tire model, applying load to the tire model, and imparting at least one of a roational displacement, a speed, and a straight advance displacement.

17. The method of claim 1, wherein if the tire model is a rolling model, the step (a) includes imparting to the fluid model influx and efflux conditions such that fluid can flow out from a top surface of the fluid model and does not flow into or flow out of surfaces other than the top surface of the fluid model.

18. The method of claim 1, wherein if the tire model is a nonrolling model, the step (a) includes providing an internal pressure to the tire model, and applying load to the tire model.

19. The method of claim 1, wherein if the tire model is a nonrolling model, the step (a) includes imparting to the fluid model influx and efflux conditions such that fluid flows into a front surface of the fluid model at a predetermined velocity, the fluid can flow from a rear surface of the fluid model and a top surface of the fluid model, and the fluid does not flow into or flow out of side surfaces of the fluid model and a lower surface of the fluid model.

20. The method of claim 9, wherein, determining a road surface model includes selecting a coefficient of friction p for road surface condition representing at least one of road surface conditions including dry, wet, icy, snowy, and unpaved conditions.

21. The method of claim 7, wherein in the steps (1) to (3), an interfering portion is generated between the tire model and the fluid model, the interfering portion is identified, and the fluid model is divided with a boundary surface which is a surface of the tire model in the interfering portion, thereby fluid elements of the fluid model are divided.

22. The method of claim 8, wherein the fluid model contains at least water, and the physical quantity is at least one of ground contact area and ground contact pressure of the tire model in order for that the behavior of the fluid model is estimated.

23. The method of claim 8, wherein the fluid model contains at least water, and the physical quantity is at least one of pressure, flow volume, and flow velocity of the fluid model in order for that the behavior of the fluid model is estimated.

24. The method of claim 8, wherein the fluid model contains at least one of water and snow, and the physical quantity is at least one of ground contact area, ground contact pressure, and shearing force of the tire model on at least one of an icy road surface and a snowy road surface in order for that the behavior of the fluid model is estimated.

25. The method of claim 8, wherein the fluid model contains at least one of water and snow, and the physical quantity is at least one of pressure, flow volume, and flow velocity of the fluid model on at least one of an icy road surface and a snowy road surface in order for that the behavior of the fluid model is estimated.

26. The method of claim 8, wherein the fluid model contains at least air, and the physical quantity is at least one of pressure, flow volume, flow velocity, energy, and energy density in order for that the behavior of the fluid model is estimated.

27. The method of claim 2, wherein, in the step (d), at least one groove is formed at a portion on the tire model which portion corresponds to a higher fluid-pressure portion in the fluid model.

28. The method of claim 3, wherein, in the step (d), at least one groove is formed at a portion on the tire model which portion corresponds to a higher fluid-pressure portion in the fluid model.

29. The method of claim 4, wherein, in the step (d), at least one substantially straight groove is formed at a portion on the tire model which portion corresponds to a higher fluid-pressure portion in the fluid model.

30. The method of claim 5, wherein, in the step (d), a large-volume groove is formed at a portion on the tire model which portion corresponds to a higher fluid-pressure portion in the fluid model.

31. The method of claim 6, wherein at least one of the notch and the sipe is formed at a portion on the tire model which portion corresponds to a higher fluid-pressure portion in the fluid model.

32. A method of designing a vulcanizing mold for a tire, comprising the steps of:

(a) determining a tire model having no pattern configuration to which deformation can be imparted by at least one of ground contact and rolling, and a fluid model at least partially filled with a fluid which comes into contact with at least a portion of the tire model;

(b) performing deformation calculation of the tire model based on said at least one of ground contact and rolling of the tire model;

(c) performing fluid calculation of the fluid model based on said at least one of ground contact and rolling of the tire model;

(d) identifying a boundary surface between the tire model after the deformation calculation in the step (b) and the fluid model after the fluid calculation in the step (c);

(e) imparting a boundary condition, relating to the identified boundary surface, to the tire model and the fluid model;

(f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow;

(g) determining a physical quantity present in at least one of the tire model and the fluid model in the steps (d)–(f);

(h) estimating the behavior of the fluid model on the basis of the physical quantity; and (i) designing a vulcanizing mold for the tire on the basis of the tire model which has a pattern configuration designed on the basis of the behavior of the fluid model.

33. A method of making a vulcanizing mold for a tire, wherein a vulcanizing mold for a pneumatic tire is designed by the method of designing a vulcanizing mold for a tire comprising the steps of: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on said at least one of ground contact and rolling of the tire model; (c) performing fluid calculation of the fluid model based on said at least one of ground contact and rolling of the tire model; (d) identifying a boundary surface between the tire model after the deformation calculation in the step (b) and the fluid model after the fluid calculation in the step (c); (e) imparting a boundary condition, relating to the identified boundary surface, to the tire model and the fluid model; (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow; (g) determining a physical quantity present in at least one of the tire model and the fluid model in the steps (d)–(f); (h) estimating the behavior of the fluid model on the basis of the physical quantity; and (i) designing a vulcanizing mold for the tire on the basis of the tire model which has a pattern configuration designed on the basis of the behavior of the fluid model.

34. A method of manufacturing a pneumatic tire, wherein a vulcanizing mold for a pneumatic tire is made by the method of designing a vulcanizing mold for a tire comprising the steps of: (a) determining a tire model having no pattern configuration to which deformation can be imparted by at least one of ground contact and rolling, and a fluid model at least partially filled with a fluid which comes into contact with at least a portion of the tire model; (b) performing deformation calculation of the tire model based on said at least one of ground contact and rolling of the tire model; (c) performing fluid calculation of the fluid model based on said at least one of ground contact and rolling of the tire model; (d) identifying a boundary surface between the tire model after the deformation calculation in the step (b) and the fluid model after the fluid calculation in the step (c); (e) imparting a boundary condition, relating to the identified boundary surface, to the tire model and the fluid model; (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow; (g) determining a physical quantity present in at least one of the tire model and the fluid model in the steps (d)–(f); (h) estimating the behavior of the fluid model on the basis of the physical quantity; and (i) designing a vulcanizing mold for the tire on the basis of the tire model which has a pattern configuration designed on the basis of the behavior of the fluid model.

35. A method of manufacturing a pneumatic tire comprising the steps of:
   (a) determining a tire model having no pattern configuration to which deformation can be imparted by at least one of ground contact and rolling, and a fluid model at least partially filled with a fluid which comes into contact with at least a portion of the tire model;
   (b) performing deformation calculation of the tire model based on said at least one of ground contact and rolling of the tire model;
   (c) performing fluid calculation of the fluid model based on said at least one of ground contact and rolling of the tire model;
   (d) identifying a boundary surface between the tire model after the deformation calculation in the step (b) and the fluid model after the fluid calculation in the step (c);
   (e) imparting a boundary condition, relating to the identified boundary surface, to the tire model and the fluid model;
   (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow;
   (g) determining a physical quantity present in at least one of the tire model and the fluid model in the steps (d)–(f);
   (h) estimating the behavior of the fluid model on the basis of the physical quantity; and
   (i) designing a vulcanizing mold for the tire on the basis of the tire model which has a pattern configuration designed on the basis of the behavior of the fluid model.

36. A recording medium with a tire designing program recorded thereon for designing a tire by a computer, wherein the tire designing program comprises the steps of:
   (a) determining a tire model having no pattern configuration to which deformation can be imparted by at least one of ground contact and rolling, and a fluid model at least partially filled with a fluid which comes into contact with at least a portion of the tire model;
   (b) performing deformation calculation of the tire model based on said at least one of ground contact and rolling of the tire model;
   (c) performing fluid calculation of the fluid model based on said at least one of ground contact and rolling of the tire model;
   (d) identifying a boundary surface between the tire model after the deformation calculation in the step (b) and the fluid model after the fluid calculation in the step (c);
   (e) imparting a boundary condition, relating to the identified boundary surface, to the tire model and the fluid model;
   (f) performing deformation calculation of the tire model and fluid calculation of the fluid model, wherein the steps of identifying a boundary surface, imparting a boundary condition, and performing deformation calculation of the tire model and fluid calculation of the fluid model are repeated until the fluid model assumes a state of pseudo flow;
   (g) determining a physical quantity present in at least one of the tire model and the fluid model in the steps (d)–(f);
   (h) estimating the behavior of the fluid model on the basis of the physical quantity; and
   (i) designing a vulcanizing mold for the tire on the basis of the tire model which has a pattern configuration designed on the basis of the behavior of the fluid model.

* * * * *